(12) United States Patent
Matsumoto et al.

(10) Patent No.: US 6,999,103 B2
(45) Date of Patent: Feb. 14, 2006

(54) VIDEO OBJECT CLIPPING METHOD AND APPARATUS

(75) Inventors: Nobuyuki Matsumoto, Kawasaki (JP); Osamu Hori, Yokohama (JP); Takashi Ida, Kawasaki (JP); Hidenori Takeshima, Ebina (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 207 days.

(21) Appl. No.: 10/391,806

(22) Filed: Mar. 20, 2003

(65) Prior Publication Data
US 2003/0184562 A1 Oct. 2, 2003

(30) Foreign Application Priority Data
Mar. 29, 2002 (JP) ............................. 2002-097760

(51) Int. Cl.
G09G 5/00 (2006.01)
(52) U.S. Cl. ...................................... 345/620; 345/629
(58) Field of Classification Search ................ 345/620, 345/621, 625, 626, 648, 649, 660, 672, 629, 345/647; 382/276, 282–283
See application file for complete search history.

(56) References Cited

U.S. PATENT DOCUMENTS

| | | | | |
|---|---|---|---|---|
| 4,783,833 A | * | 11/1988 | Kawabata et al. | ............ 382/107 |
| 5,274,453 A | * | 12/1993 | Maeda | ......................... 348/584 |
| 5,684,887 A | * | 11/1997 | Lee et al. | ..................... 382/107 |
| 5,880,741 A | * | 3/1999 | Takeuchi | ..................... 345/626 |
| 6,097,853 A | * | 8/2000 | Gu et al. | ...................... 382/282 |
| 6,215,516 B1 | * | 4/2001 | Ma et al. | ......................... 348/43 |
| 6,307,954 B1 | * | 10/2001 | Mandelbaum et al. | ....... 382/154 |
| 6,335,985 B1 | * | 1/2002 | Sambonsugi et al. | ........ 382/190 |
| 6,373,970 B1 | * | 4/2002 | Dong et al. | .................. 382/128 |
| 6,434,271 B1 | * | 8/2002 | Christian et al. | ............ 382/194 |
| 6,556,775 B1 | * | 4/2003 | Shimada | ...................... 386/121 |
| 6,600,491 B1 | * | 7/2003 | Szeliski et al. | ............. 345/473 |
| 6,621,524 B1 | * | 9/2003 | Iijima et al. | ................. 348/584 |
| 6,687,408 B2 | * | 2/2004 | Boon | .......................... 382/238 |
| 6,748,112 B1 | * | 6/2004 | Nguyen et al. | ............. 382/203 |
| 6,819,778 B2 | * | 11/2004 | Kamei | .......................... 382/103 |
| 2002/0054032 A1 | * | 5/2002 | Aoki et al. | .................. 345/204 |
| 2003/0044045 A1 | * | 3/2003 | Schoepflin et al. | .......... 382/103 |
| 2003/0076990 A1 | * | 4/2003 | Brand | .......................... 382/154 |
| 2004/0004626 A1 | * | 1/2004 | Ida et al. | ..................... 345/626 |
| 2004/0062440 A1 | * | 4/2004 | Srinivasa | ..................... 382/173 |

FOREIGN PATENT DOCUMENTS

| | | |
|---|---|---|
| JP | 2000-82145 | 3/2000 |
| JP | 2001-14477 | 1/2001 |

OTHER PUBLICATIONS

N. Yagi, et al., "Multi-Motion", Gazou Labo, vol. 9, No. 4, Nihon Kongyou Shuppan, Apr. 1998.

(Continued)

*Primary Examiner*—Ryan Yang
(74) *Attorney, Agent, or Firm*—Oblon, Spivak, McClelland, Maier & Neustadt, P.C.

(57) ABSTRACT

A video object clipping method includes storing, in a storage unit, original images each including a video object to be clipped and reference alpha images representing objects prepared, determining a criteria original image and a criteria reference alpha image from the original images and the reference alpha images, determining a deformation parameter by deforming the criteria reference alpha image to correspond to the criteria original image, and deforming remaining ones of the reference alpha images according to the determined deformation parameter to generate output alpha images corresponding to the original images.

10 Claims, 24 Drawing Sheets

OTHER PUBLICATIONS

Noel Brady, "MPEG-4 Standardized Methods for the Compression of Arbitrarily Shaped Video Objects", IEEE Transactions on Circuits and Systems for Video Technology, vol. 9, No. 8, Dec. 1999.

* cited by examiner

VIDEO OBJECT CLIPPING METHOD AND APPARATUS

CROSS-REFERENCE TO RELATED APPLICATIONS

This application is based upon and claims the benefit of priority from the prior Japanese Patent Application No. 2002-097760, filed Mar. 29, 2002, the entire contents of which are incorporated herein by reference.

BACKGROUND OF THE INVENTION

1. Field of the Invention

This invention relates to a video object clipping method of clipping video objects from a video image and a video object clipping apparatus.

2. Description of the Related Art

There is a video object clipping technique for clipping a video object from a video image. The technique is utilized for creating a catalog or a poster by combining the clipped video object with another background image, or for creating contents of a Web page.

In addition, the video object clipping technique can be used for designating an anchor area for producing such image contents that provide related information if a user points a video object with the related information (name, a price).

As disclosed in a document "MPEG-4 standardized methods for the compression of arbitrarily shaped video objects" N. Brady (IEEE Transactions on Circuits and Systems for Video Technology, vol. 9,no. 8,pp. 1170 1189, December 1999), MPEG-4 that is International Standard of video compression adopts an object encoding function for encoding data every object. The video object clipping technique for clipping a video object from a video image is used for the purpose of generating object data before encoding.

As a concrete example of the video object clipping technique there is "picture contour line extraction apparatuses" disclosed in Jpn. pat. Appln. KOKAI Publication No. 2001-14477. This is a method including inputting a contour by drawing a line using a pointing device such as a mouse, and modifying the contour. However, generally, a user must move a pointing device along unevenness of the video object to be clipped from the video image, when inputting a contour by a manual input. As a result, a time and labor are spent to input manually and accurately the contour of the object.

On the other hand, in a clip tool of a writing brush printing software made of Creo Co., Ltd., some templates are prepared beforehand, and a desired region is clipped by deforming the template ("Fude mame Ver. 11 (Treadmark)" guidebook, page 109–110). If this tool is used, the template can be used for clipping an object when the shape of the object is similar to the template.

However, in a method of clipping a video object by deforming a reference alpha image, there is a problem that a user must adjust a deformation parameter by times corresponding to the number of the original images to clip the video object from a plurality of original images.

BRIEF SUMMARY OF THE INVENTION

It is an object of the present invention to provide a video object clipping method and apparatus which generate an alpha image expressing a video object from a plurality of original images.

According to an aspect of the invention, there is provided a method of clipping an object image from an image comprising: storing, in a storage unit, a plurality of original images each including an object image to be clipped and a plurality of reference alpha images representing objects prepared beforehand; determining a criteria original image and a criteria reference alpha image from the original images and the reference alpha images; determining a deformation parameter by deforming the criteria reference alpha image so as to correspond to the criteria original image; and deforming remaining ones of the reference alpha images according to the determined deformation parameter to generate output alpha images corresponding to the original images.

DETAILED DESCRIPTION OF THE INVENTION

There will now be described embodiments of the present invention in conjunction with the drawings.

(First Embodiment)

Figure 1:
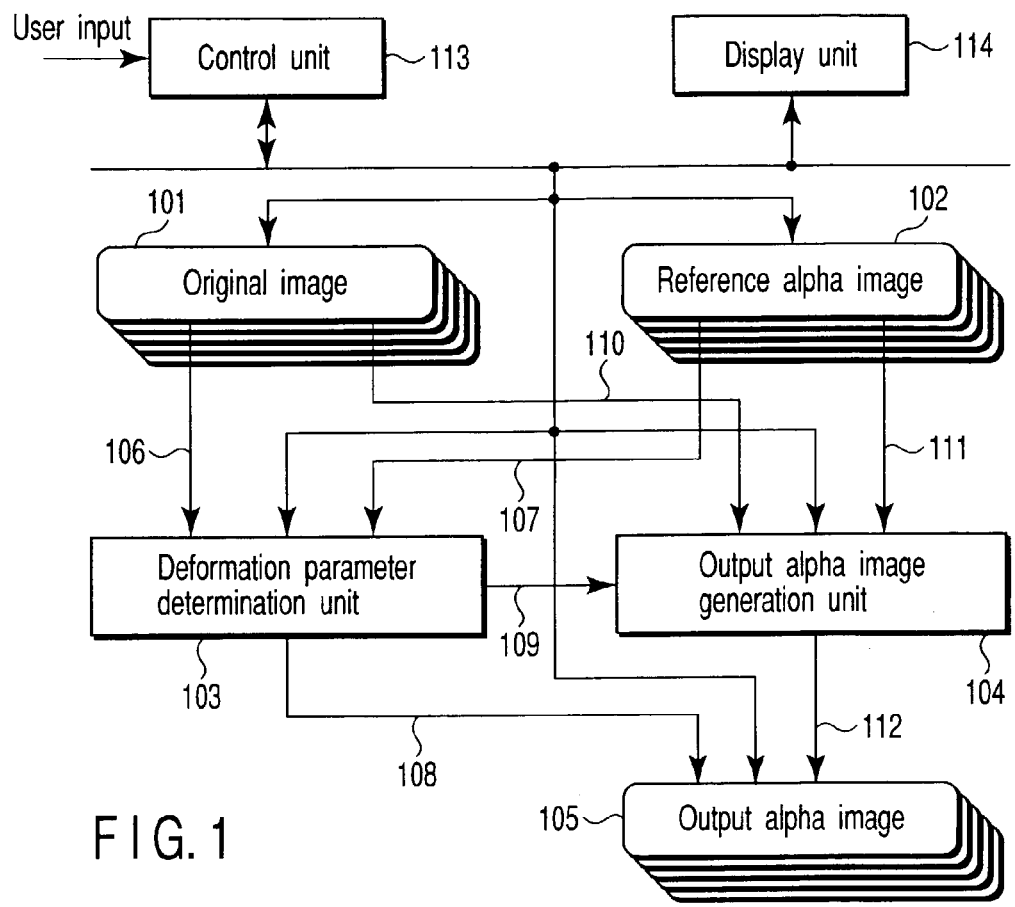
FIG. 1 is a block diagram of a video object clipping apparatus according to a first embodiment of the present invention.

According to the first embodiment of FIG. 1, a video object clipping apparatus comprises a storage unit 101, a storage unit 102, a deformation parameter determination unit 103, an output alpha image generation unit 104 and a storage unit 105. The storage unit 101 stores a plurality of original images in which a video object to be clipped is contained. The storage unit 102 stores a plurality of reference alpha images prepared beforehand. The deformation parameter determination unit 103 determines a deformation parameter used for deforming a criteria reference alpha image corresponding to a criteria original image. The output alpha image generation unit 104 generates output alpha images of remaining original images by deforming remaining reference alpha images according to the deformation parameter. The storage unit 105 stores the output alpha images expressing video objects corresponding to original images 101 and generated by the output alpha image generation unit 104. A control unit 113 comprises a processor and the like, and is connected to the above units 101 to 105 and a display unit 114 for controlling these units.

Figure 2:
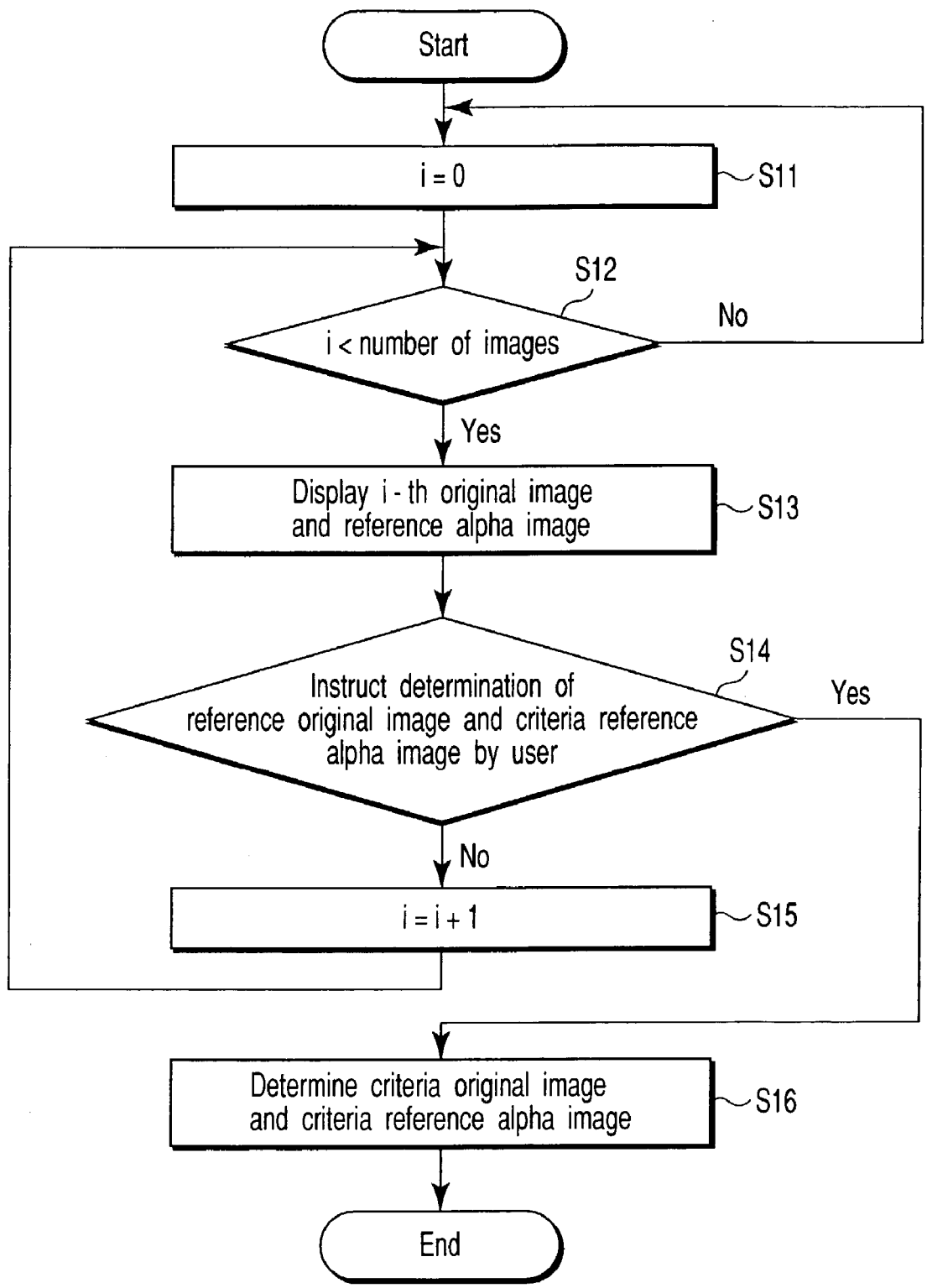
FIG. 2 is a flowchart which shows a flow of a first selection method of selecting a criteria original image and a criteria reference alpha image according to the first embodiment.

The operation of the video object clipping apparatus will be described referring to FIG. 2.

A set of a criteria original image 106 and a criteria reference alpha image 107 is selected from the storage unit 101 and the storage unit 102. This may use a set of original images prepared as a criteria original image and a criteria reference alpha image beforehand, and a reference alpha image.

If the original images and the alpha images correspond to each other, the set of original image and reference alpha image is displayed on the display unit 114 every set of images. A user determines a criteria original image and a criteria reference alpha image on the basis of the displayed images.

In other words, at first, the set i of the original image and reference alpha image are reset (S11). The image set i is compared with the number of the images (S12). If i<the number of images, the original image and reference alpha image of the set i are displayed on the display unit 114 (S13). If the displayed criteria original image and criteria reference alpha image match with each other, the user instructs a determination (S14). However, if they do not match with each other, the user does not instruct the determination. If the determination is not instructed, i is incremented (S15), and the process returns to step 12. This process is repeated.

When the determination is instructed in step S14, the criteria original image and criteria reference alpha image are decided, and the process is finished. If i exceeds the number of images in step S12, the process returns to step 11 and i is reset.

If the original images and the reference alpha images do not correspond to each other, the original images are displayed sequentially, and the user determines a criteria original image from the displayed images. The reference alpha images are displayed sequentially together with the determined criteria original image. The user determines a criteria reference alpha image from the sequentially displayed reference alpha images. As a result, the criteria original image and criteria alpha image are decided.

Figure 3:
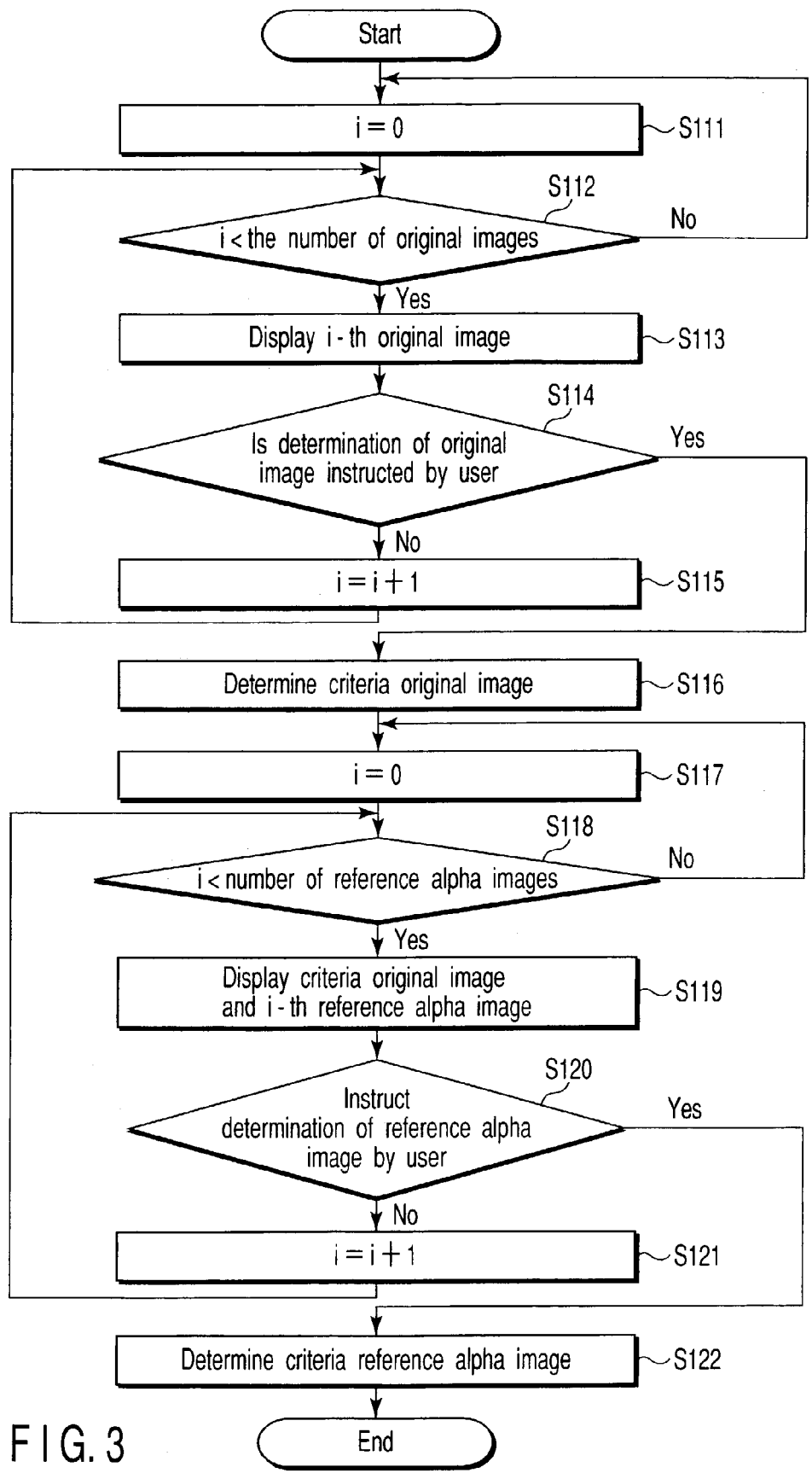
FIG. 3 is a flowchart which shows a flow of a second selection method of selecting a criteria original image and a criteria reference alpha image according to the first embodiment.

In other words, as shown in FIG. 3, at first i is reset (S111) and i<the number of original images is determined (S112). If the determination in step 112 is YES, the i-th original image is displayed (S113). It is determined whether the user instructs a determination based on this displayed image (S114). When this determination is NO, the process is incremented (S115) and returns to step S112. When the determination is YES, the criteria original image is decided (S116). Then, i is reset (S117) and it is determined whether i is smaller than the number of reference alpha images (S118). When this determination is YES, the criteria original image and i-th reference alpha image are displayed (S119). It is determined whether the determination of the reference alpha image is instructed by the user (S120). When this determination is NO, i is incremented (S121), and the process returns to step S118. When the determination is YES, the criteria alpha image is determined (S122) and the process is finished.

Figure 4:
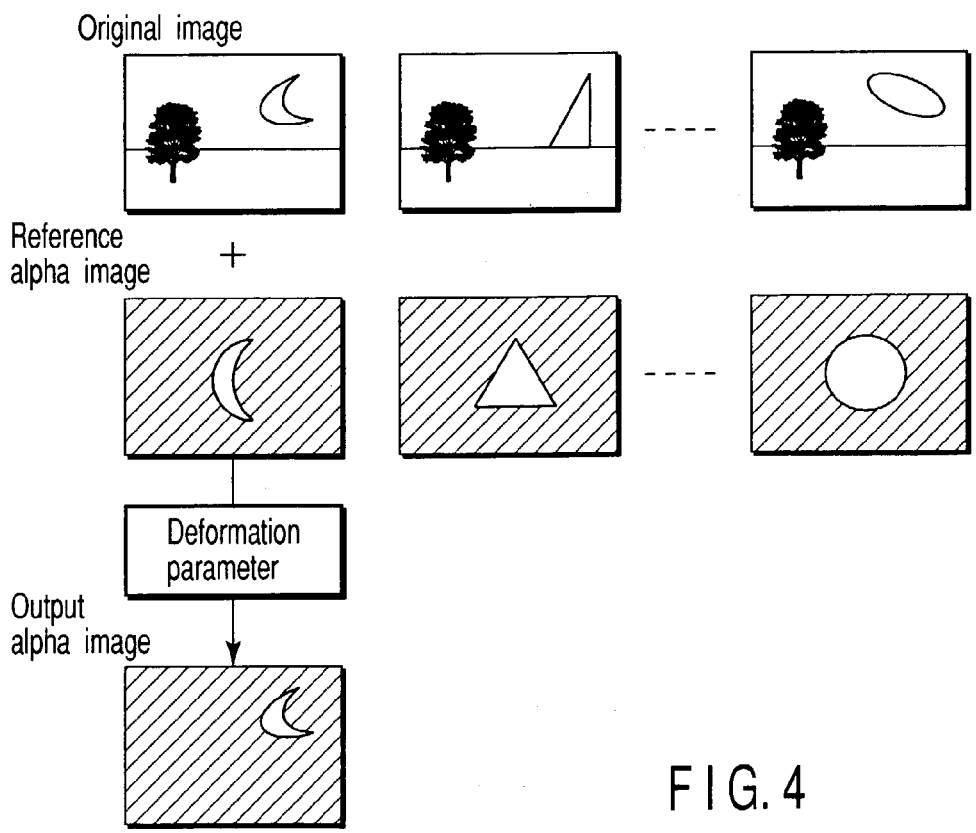
FIG. 4 is a diagram showing an image processing status determined by a deformation parameter determination unit 103 of the video object clipping apparatus according to the first embodiment.

The selected criteria original image and criteria reference alpha image are input to the deformation parameter decision unit 103. The deformation parameter determination unit 103 generates an output alpha image 108 corresponding to the criteria original image 106 as shown in FIG. 4, when a criteria reference alpha image 107 corresponding to the criteria original image 106 is deformed according to a certain deformation parameter. The output alpha image 108 is stored in the output alpha image storage unit 105. The deformation parameter may be determined by displaying the criteria reference alpha image 107 and the criteria original image 106 by superposing one on another, dragging the images by means of a pointing device such as a mouse to move the images in parallel, changing the size of the image or rotating the image. Alternatively, the criteria reference alpha image 107 may be deformed by input of a deformation parameter value. The deformation parameter determination unit 103 outputs a deformation parameter 109 indicating a relation between the criteria original image 106 and criteria reference alpha image 107 and the output alpha image 108 of an original image.

Figure 5:
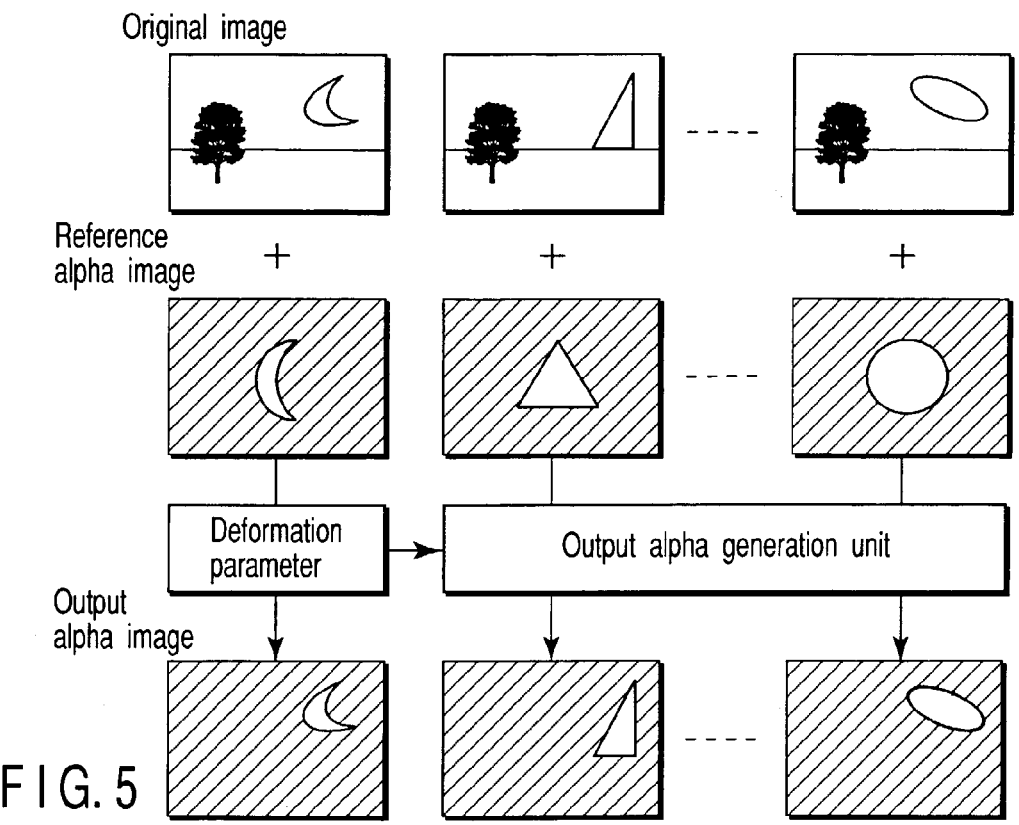
FIG. 5 is a diagram showing another image processing status determined by the video object clipping apparatus according to the first embodiment.

Remaining reference alpha images 111, remaining original images 110 and the deformation parameter 109 determined by the deformation parameter determination unit 103 are input to the output alpha image generation unit 104. The output alpha image generation unit 104 deforms the remaining reference alpha images 111 by the deformation parameter 109 determined by the deformation parameter determination unit 103 as shown in FIG. 5. As a result, the output alpha images 112 of the remaining original images 110 are generated and stored in the output alpha image storage unit 105.

By the above embodiment, the output alpha images expressing video objects can be easily generated with respect to a plurality of original images.

(Second Embodiment)

Figure 6:
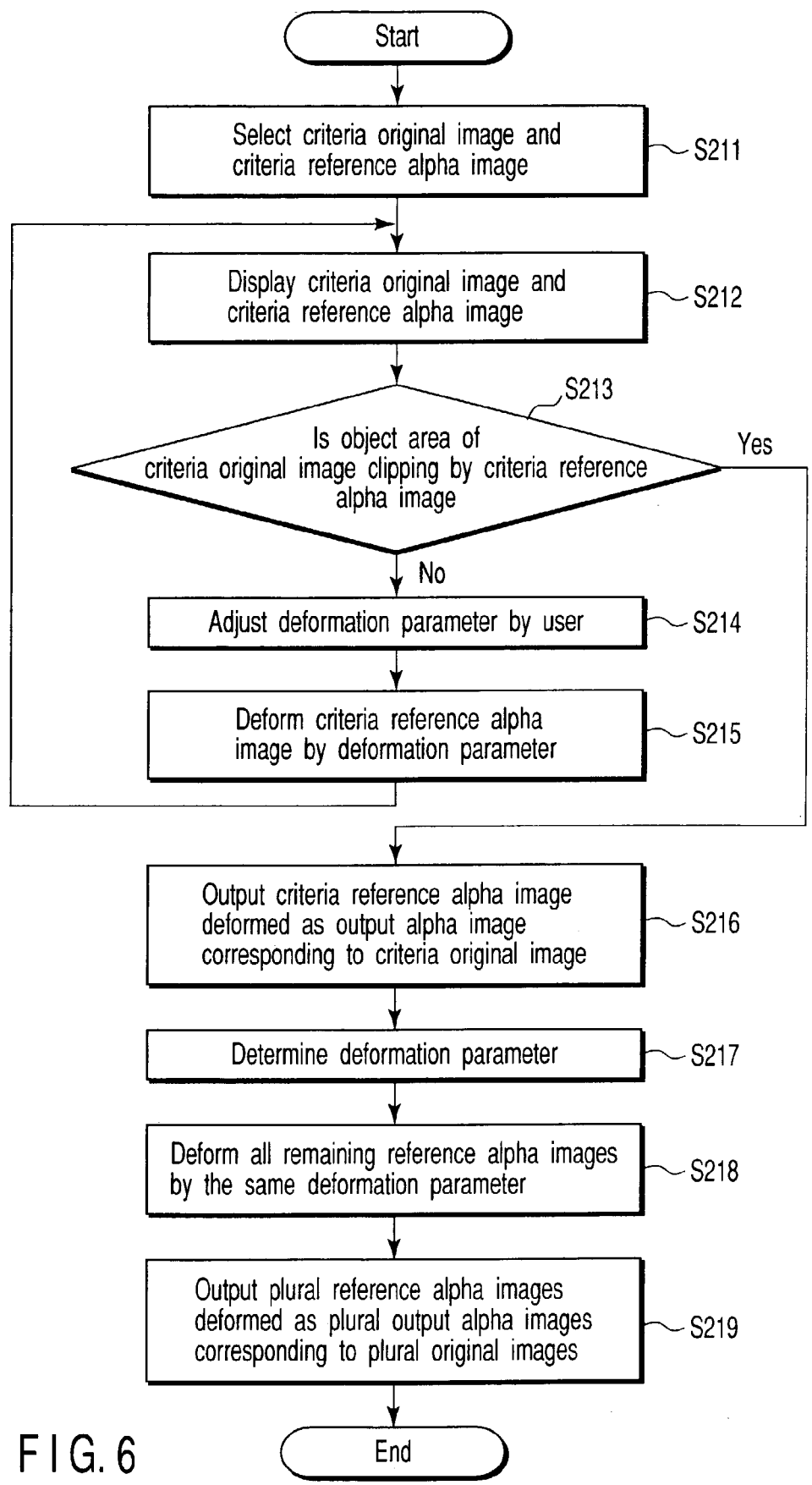
FIG. 6 is a flowchart showing a flow of a video object clipping process according to a second embodiment.

FIG. 6 is a flowchart showing a flow of a video object clipping method according to the second embodiment of the present invention. In the video object clipping method, at first a criteria original image and a criteria reference alpha image are selected from a plurality of original images and a plurality of reference alpha images, similarly to the first embodiment (S211). The criteria original image and criteria reference alpha image are displayed on the display unit (S212). In this display, these images may be displayed on separated windows. Also, the criteria reference alpha image may be made semitransparent and superposed on the criteria original image.

It is determined whether the criteria reference alpha image clips the video object of the criteria original image (S213). When this determination is NO, the deformation parameter is adjusted (S214), and the criteria reference alpha image is deformed according to the adjusted deformation parameter (S215). The process returns to step S212.

In step S213, when the deformed criteria reference alpha image clips the video object of the criteria original image, this deformed criteria reference alpha image is output as an output alpha corresponding to the criteria original image (S216), and the deformation parameter is determined (S217).

Using the same deformation parameter as the deformation parameter obtained as described above, all remaining reference alpha images are deformed (S218). As a result, the deformed reference alpha images are output as a plurality of output alpha images corresponding to a plurality of original images (S219).

By the embodiment, the output alpha images expressing video objects can be easily generated with respect to a plurality of original images.

(Third Embodiment)

In this embodiment, the original images stored in the storage unit 101 are not a plurality of original images corresponding to different objects, but a string of sequential images obtained by imaging the same object. Also, the reference alpha images stored in the storage unit 102 are not a plurality of object templates corresponding to different objects, but a string of reference alpha images expressing the template of the same object. Accordingly, a moving object can be clipped from the video image.

Figure 7:
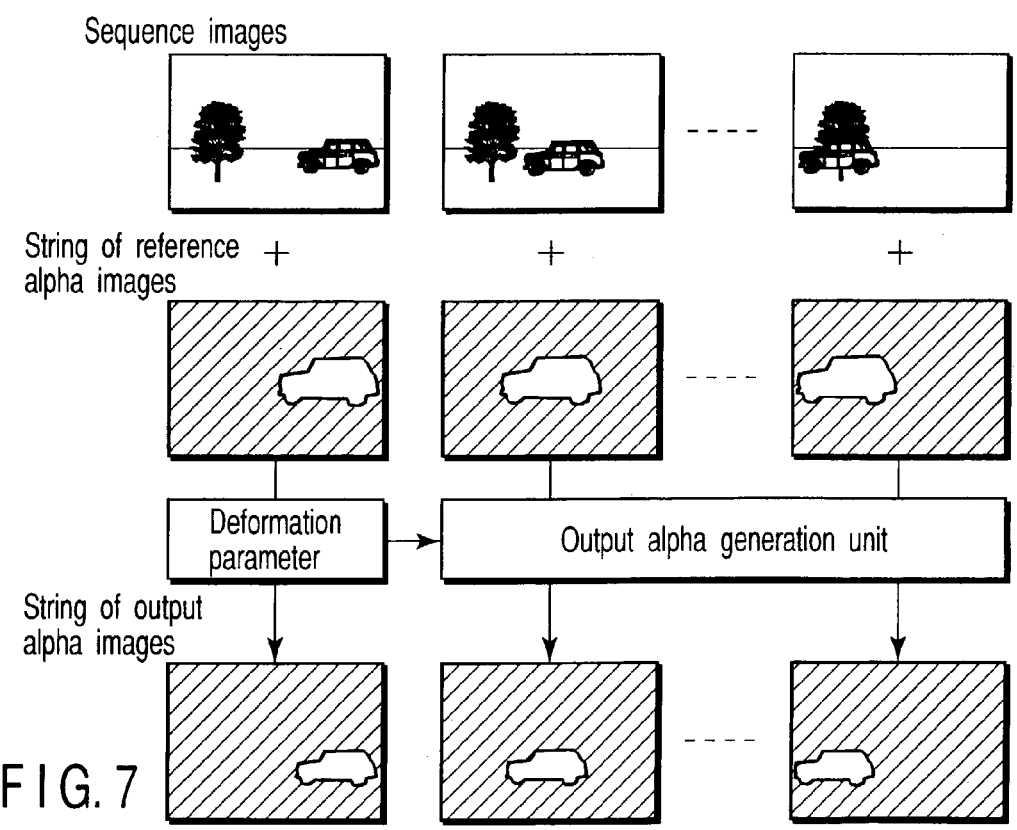
FIG. 7 is a diagram showing an example of clipping a moving object from a sequence of images according to a third embodiment.

There will now be described an operation for clipping a video object from a string of images obtained by deforming a string of reference alpha images, referring to FIG. 7. The sequential images in FIG. 7 show a status that a car moving from the right to the left in a screen. The string of reference alpha images wherein the car moves from the right to the left on a screen is prepared as a string of reference alpha images. For example, an original image of the first frame and a reference alpha image thereof are selected as a set of a criteria sequential image and a criteria reference alpha image. The set of criteria original image and criteria reference alpha image are input to the deformation parameter determination unit 103, to determine an output alpha image of the first frame and a deformation parameter. The output alpha image generation unit 104 generates a string of output alpha images corresponding to remaining sequential images by deforming remaining reference alpha images according to the deformation parameter.

According to the above embodiment, the moving video object can be clipped from the sequential image using the deformation of the reference alpha image. The present method is applied not only to clipping the car that moves in the same direction, but also to extracting an object such as a person, from a sequential image which can prepare a string of reference alpha images, for example, a sports image such as a serve of a tennis, a throw of a baseball or a swing of a golf that movement of the object is approximately constant every time.

(Fourth Embodiment)

In this embodiment, the deformation parameter 109 is limited to deformations such as a parallel movement, a size conversion and a rotation. As a result, the determination and expression of the deformation parameter are simplified. The deformation based on the parallel movement, a size conversion, a rotation, a reverse, etc. is called an affine deformation. This is a deformation expressed by the following equation:

$$\begin{pmatrix} X \\ Y \end{pmatrix} = \begin{pmatrix} a & b \\ c & d \end{pmatrix} \begin{pmatrix} x \\ y \end{pmatrix} + \begin{pmatrix} e \\ f \end{pmatrix}$$

The deformation parameter is expressed by a parameter (a, b, c, d) on the scaling and rotation, and a parameter (e, f) on the parallel movement. This deformation parameter can be determined by a process of displaying an original image and a reference alpha image by superposing one on another, dragging the superposed image by a pointing device such as a mouse, and subjecting the image to a scaling, a rotation and a parallel movement. The deformation parameter can be determined by directly inputting a deformation parameter value representing the scaling, rotation and parallel movement.

By the above embodiment, a designated object can be easily clipped from a plurality of original images using an affine deformation parameter.

(Fifth Embodiment)

In this embodiment, the display unit 113 displays a criteria original image and displays selectively a plurality of reference alpha images. One of the displayed reference alpha images is determined as a criteria reference alpha image by the user. This configuration permits to select a criteria reference alpha image from the reference alpha images.

Figure 8:
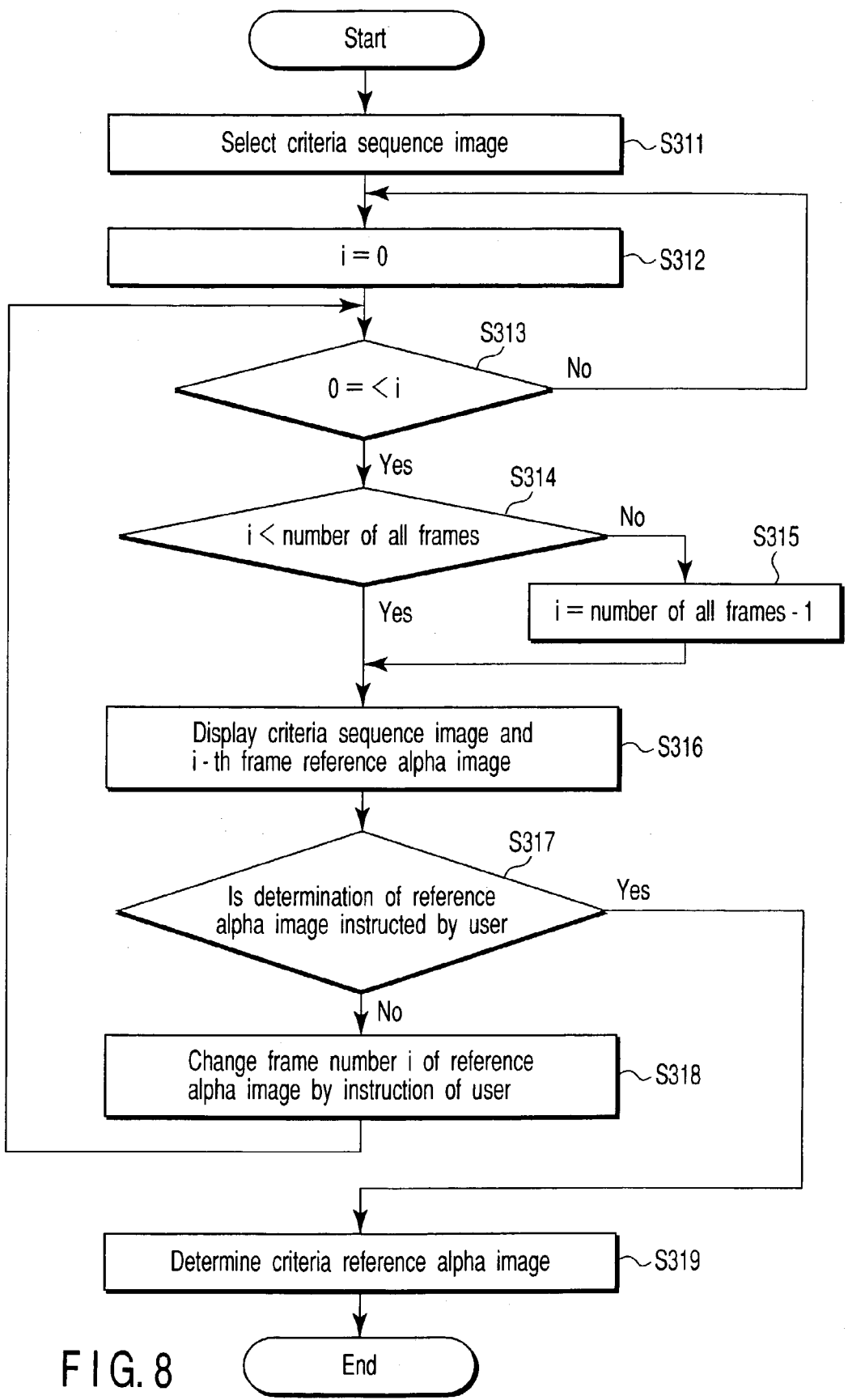
FIG. 8 is a flowchart showing a flow of a video object clipping process according to a fifth embodiment.
Figure 9:
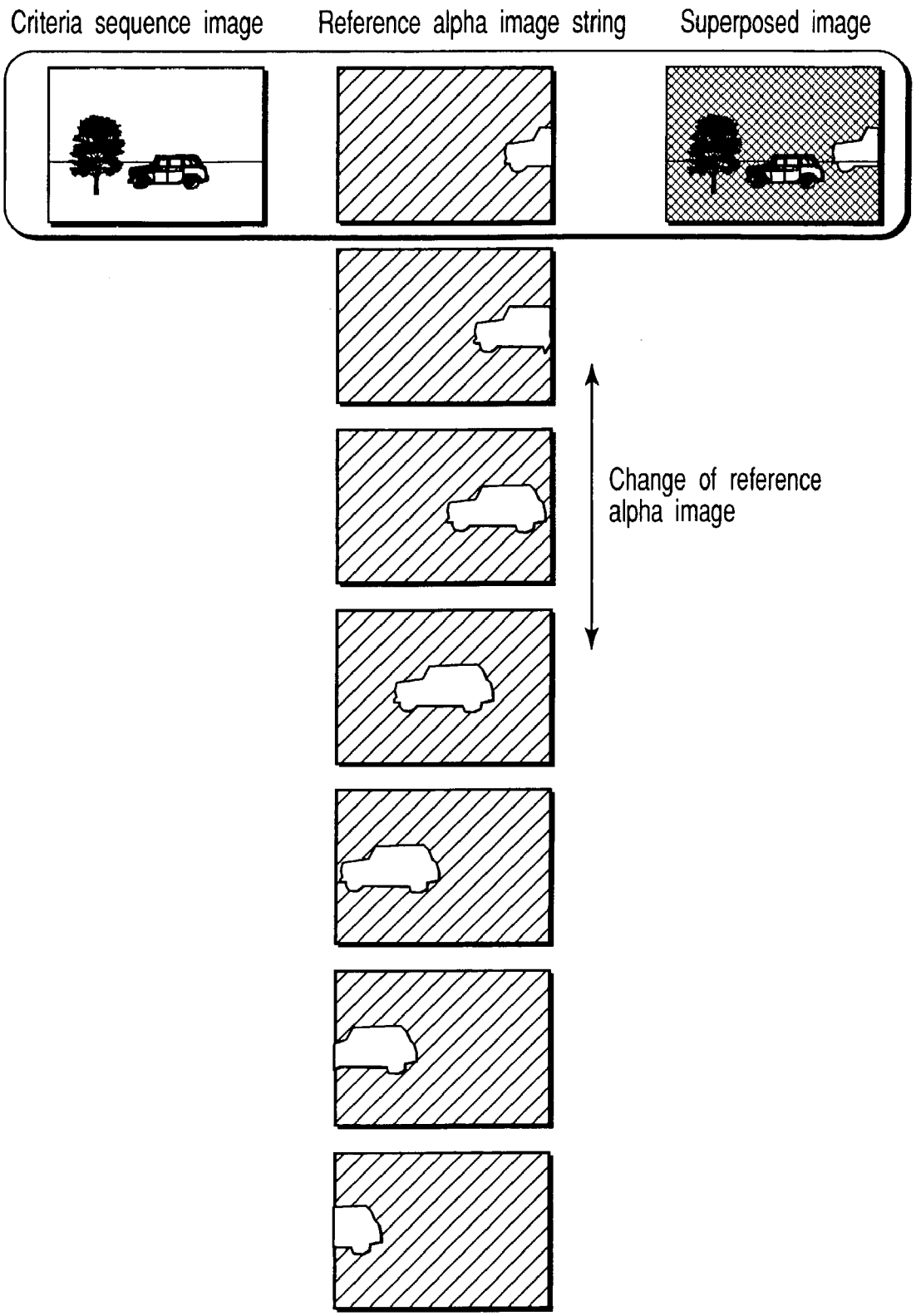
FIG. 9 is a diagram showing a status of selectively determining a criteria reference alpha image in the video object clipping process according to the fourth embodiment.

Using a flowchart shown in FIG. 8, a method of making a sequential image associate with a string of the reference alpha images with respect to a time axis will be explained. The user selects a frame of a criteria sequential image from the sequential images (S311). This image may use a sequential image prepared beforehand as the criteria sequential image, and may determine the criteria original image by a method of determining a criteria image that is shown in FIG. 3.

i is reset (S312) and it is determined whether i is not less than 0 (S313). If this determination is YES, it is determined whether i is less than the number of all frames (S314). If this determination is NO, 1 is added to all frames and the process advances to step S316. If the determination is YES, the process advances to step 316. In step 316, the selected criteria sequential image and the i-th reference alpha image that is a temporary criteria reference alpha image are displayed. These images may be displayed on separated windows. As shown in FIG. 9, a composite image obtained by superposing the criteria sequential image and the i-th reference alpha image may be displayed. The i-th reference image is a temporary criteria reference alpha image displayed selectively.

Figure 10:
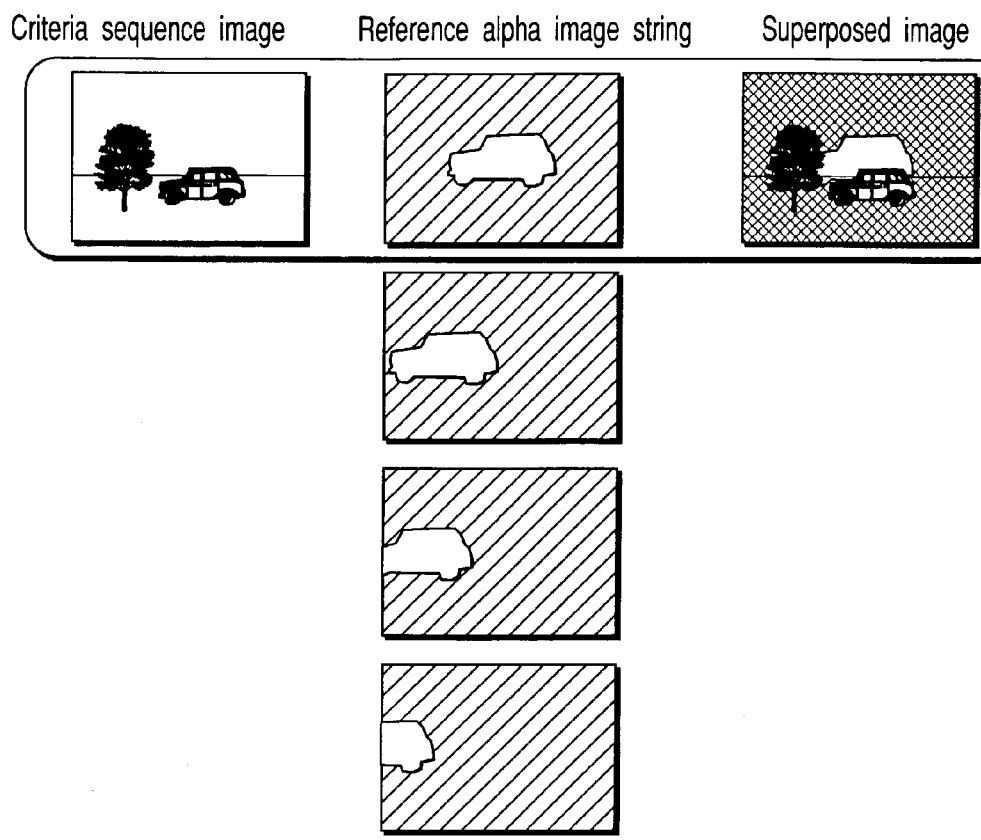
FIG. 10 is a diagram showing a status of selectively determining a criteria reference alpha image in the video object clipping process according to the fourth embodiment.

The user watches the criteria sequential image and temporary criteria reference alpha image displayed selectively, and determines whether the i-th reference alpha image which now is displayed as shown in FIG. 10 is suitable as a criteria reference alpha image. When this determination is YES, the reference alpha image is determined as a criteria reference alpha image (S319). If the determination is NO, the user watches the criteria sequential image and temporary criteria reference alpha image displayed selectively and determines whether the suitable criteria reference alpha image is a past frame or a future frame in time than the currently displayed the i-th reference alpha image. Then, the temporary criteria reference alpha image is shifted backward and forward in the time axis as shown in FIG. 9 (S318). Thereafter, the process returns to the process of displaying the temporary criteria reference alpha image shifted in the time axis and the criteria sequential image.

The frame number may be changed by a button for displaying a past frame or a future frame of the string of reference alpha images. Alternatively, the frame number may be changed by designating an arbitrary frame number with a slide bar. This process is repeated till the suitable criteria reference alpha image is determined. As thus described, the string of temporary criteria reference alpha images is adjusted in the time axis. When the criteria reference alpha image that matches with the criteria sequential image in phase as shown in FIG. 10 was found, the criteria sequential image is associated with the criteria reference alpha image. Simultaneously, each of the remaining sequential images is associated with the sequence of reference alpha images. Also, the criteria sequential image fixed till now so as not to be updated and displayed in a frame number changing process in the time axis is released. Thereafter, the sequential image and reference alpha image that associate with each other are displayed while being updated by the frame number changing process.

According to the above embodiment, the association of the sequential image with the reference alpha image can be made in the time axis. After this process, it is possible by the method explained in the third embodiment to perform a process for clipping a video object in a video image, that is, in a spatial area, to clip a moving object in the image.

(Sixth Embodiment)

In this embodiment, the display unit 113 displays a criteria reference alpha image and displays selectively a plurality of original images. One of the original images is determined as a criteria original image by the user. This configuration permits to select a criteria original image corresponding to the criteria reference alpha image.

Figure 12:
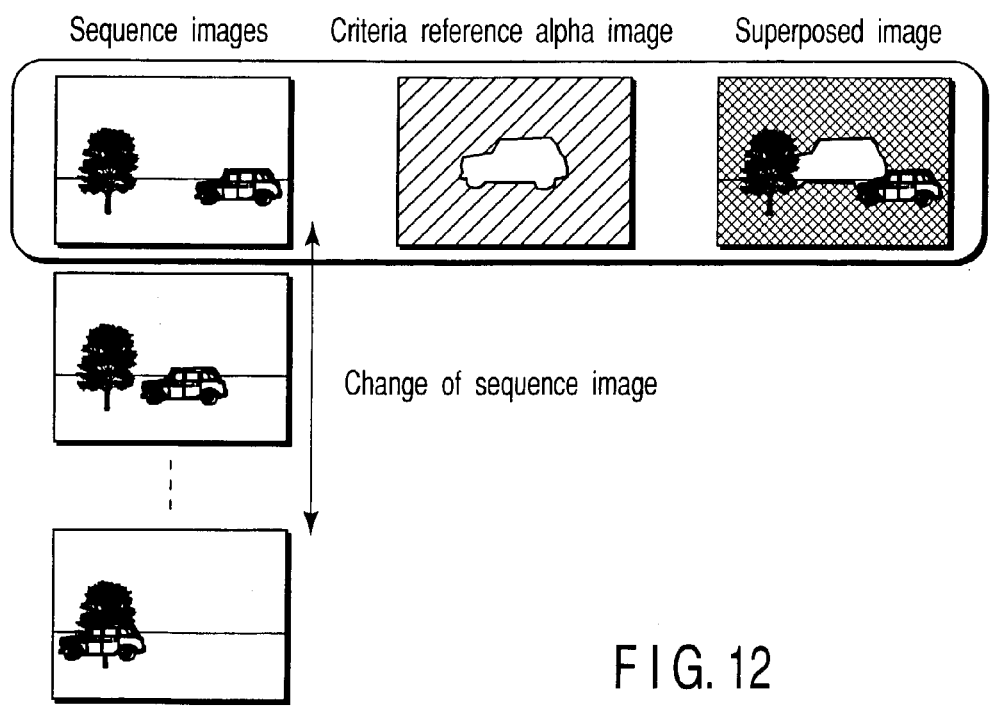
FIG. 12 is a diagram showing a status of selectively determining a criteria reference alpha image in the video object clipping process according to the fifth embodiment.
Figure 11:
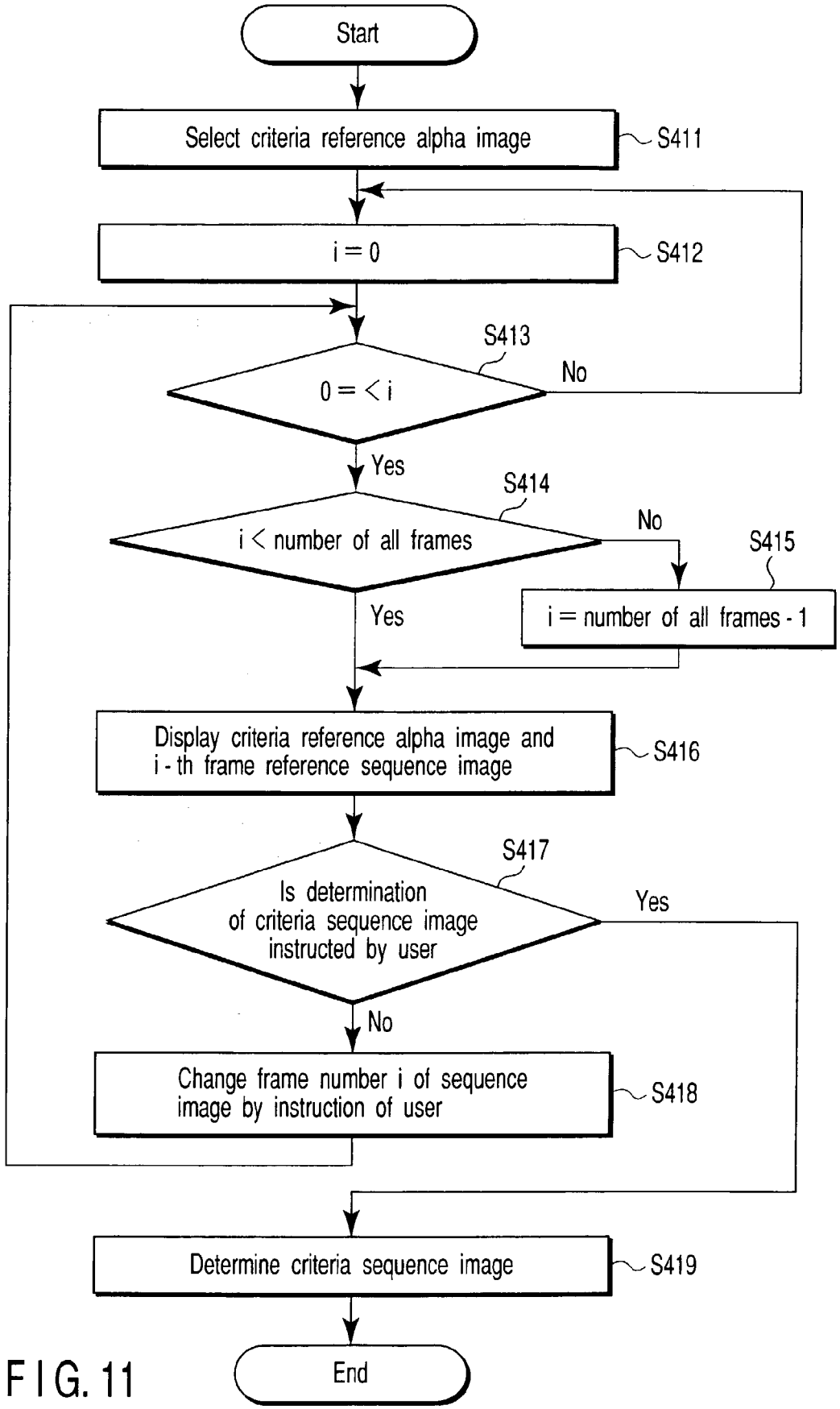
FIG. 11 is a flowchart showing a flow of a video object clipping process according to a sixth embodiment.

Using a flowchart shown in FIG. 11, a method of making the sequential images associate with the string of reference alpha images with respect to a time axis will be explained. A user selects one frame of criteria reference alpha image from the string of reference alpha images (S411). This may use a reference alpha image prepared beforehand as a criteria reference alpha image, and may be determined by a method of determining a criteria original image in FIG. 3.

i is reset to 0 (S412) and it is determined whether i is less than the number of all frames (S414). When this determination is YES, the process advances to step S416, If the determination is NO, 1 is added to the number of all frames and the process advances to step 416. In step 416, the selected criteria reference alpha image and i-th sequential image which is a temporary criteria sequential image are displayed. Both images may be displayed on separated windows side by side. The criteria alpha image and the i-th sequential image which is a temporary criteria sequential image is selectively displayed may be displayed as a composite image as shown in FIG. 12.

Figure 13:
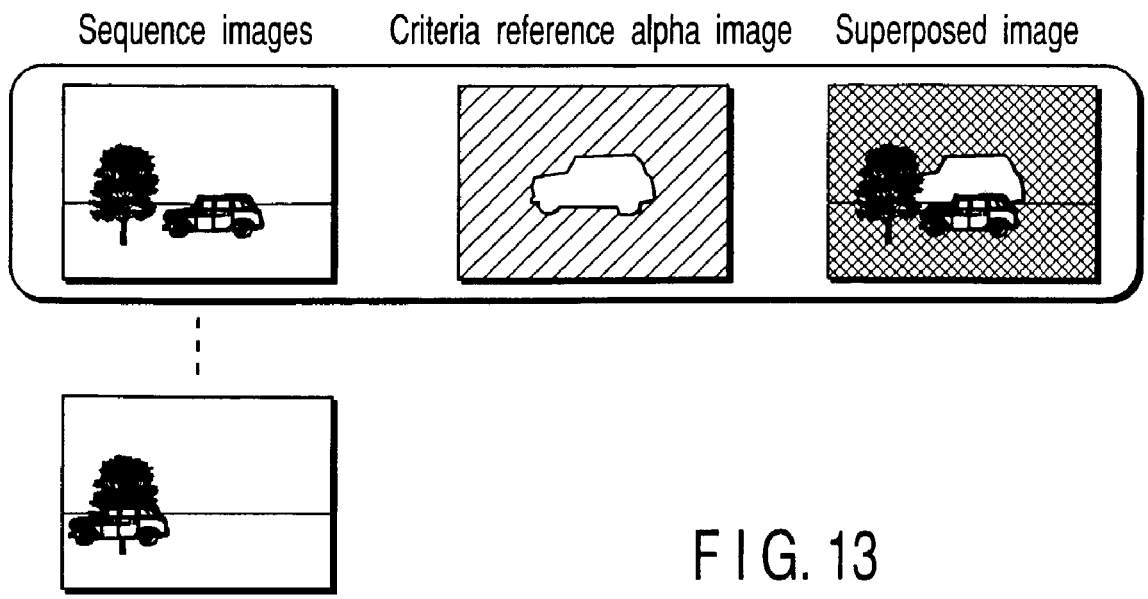
FIG. 13 is a diagram showing a status of selectively determining a criteria reference image in the video object clipping process according to the fifth embodiment.

The user watches the criteria reference alpha image and the temporary criteria sequential image displayed selectively, and determines whether the i-th sequential image which is presently displayed as shown in FIG. 13 is suitable for a criteria sequential image (S417). If this determination is YES, the sequential image is determined as a criteria sequential image (S319). If the determination is NO, the user watches the criteria reference alpha image and the temporary criteria sequential image selectively displayed and determines whether the suitable criteria sequential image is a past frame or a future frame in time than the i-th sequential image which is currently displayed. The temporary criteria sequential image is shifted backward and forward in the time axis as shown in FIG. 12. The process returns to a step of displaying the criteria reference alpha image and the temporary criteria sequential image whose frame is shifted in a time axis (S318).

The frame number may be changed every one frame by operating a button for making a display unit display a past frame or a future frame of the sequential image, or by designating an arbitrary frame number with a slide bar. This process is repeated till a suitable criteria sequential image is determined.

As thus described, when the criteria sequential image which matches with the criteria reference alpha image in phase as shown in FIG. 13 is found by adjusting the temporary criteria sequential image in a time axis, the criteria reference alpha image and the criteria sequential image are associated with each other. Simultaneously, the string of the remaining reference alpha images is associated with the sequential image. Also, the criteria sequential image fixed till now so as not to be updated and displayed by a frame number changing process in a time axis is released in fixing. Thereafter, the sequential image and the reference alpha image that are associated with each other are displayed while being updated by the frame number changing process.

According to the above embodiment, the association of the sequential image with the reference alpha image can be made in a time axis. After this process, it is possible by the method explained in the third embodiment to perform a process for clipping a video object in an image, that is, in a spatial area, to clip a moving object in the image.

(The Seventh Embodiment)

In this embodiment, a string of a plurality of reference alpha images, i.e., a reference alpha image string that is prepared beforehand has a higher frame rate in a time axis than the sequential image. A set of criteria sequential image and criteria reference alpha image is determined by a method that explained in the fifth and sixth embodiments or an image processing method. The sequential image and the reference alpha image string make the same time frame rate to be in phase by downsampling (skipping or thinning) the reference alpha image sequence using the determined criteria reference alpha image as a criteria. A string of output alpha image strings, i.e., an output alpha image string is generated using the reference alpha image string whose time frame rate is the same as that of the sequential image. As a result, it is possible to clip a moving object from the sequential image.

Figure 14:
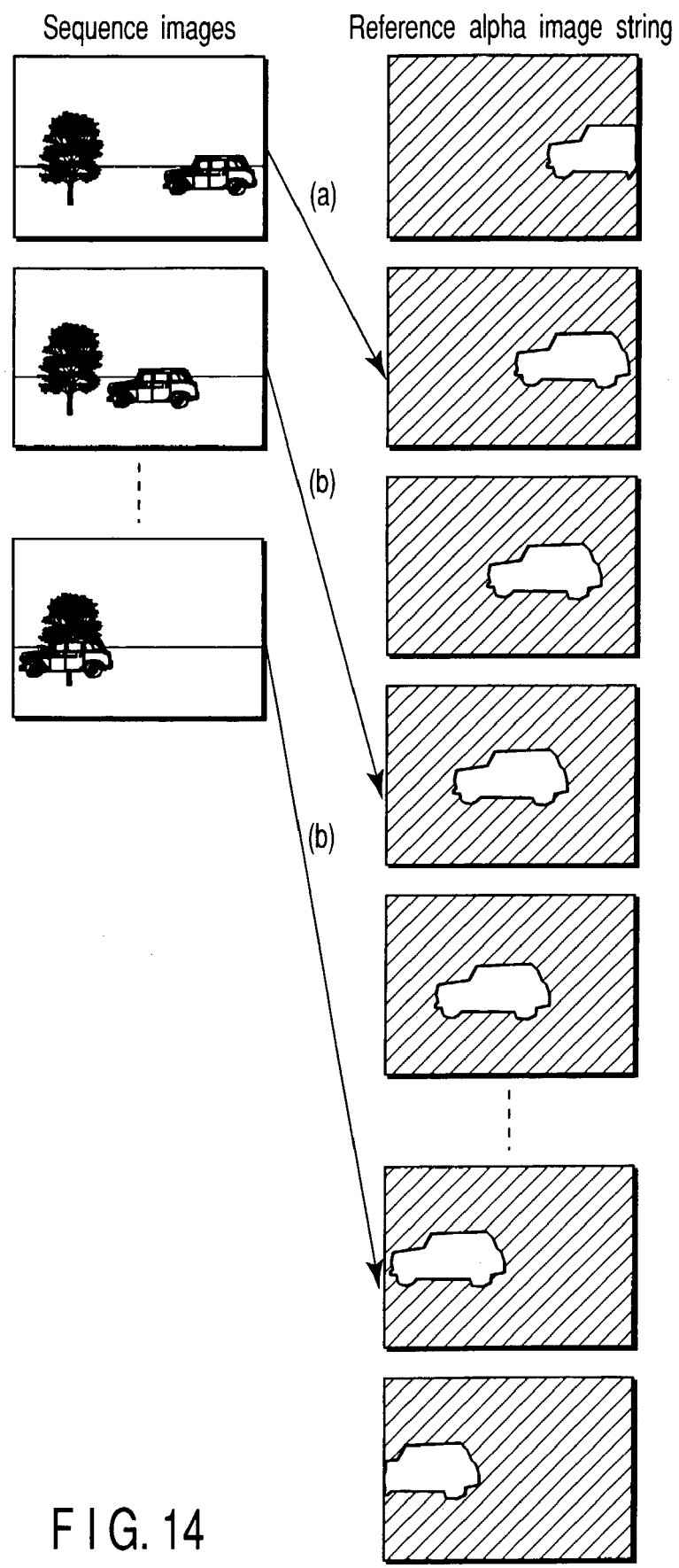
FIG. 14 is a diagram showing a status of skipping a reference alpha image string in a video object clipping process according to a seventh embodiment.

In FIG. 14, the reference alpha image string is prepared at a frame rate two times in the time axis with respect to the sequential image. A set of criteria original image and criteria reference alpha image that associate with each other is found from the sequential image and the reference alpha image string. This can be found by the methods explained in the fourth and fifth embodiments or automatically by an image processing method.

As shown by an arrow (a) in FIG. 14, a reference alpha image corresponding to the criteria original image of the first frame is selected. In this embodiment, since the reference alpha image string is prepared at a frame rate two times that of the sequential image, the reference alpha images corresponding to the remaining sequential images are determined as shown by an arrow (b) in FIG. 14 by selecting the reference alpha images with one frame being skipped. As a result, the sequential image and the reference alpha image string are the same time frame rate to be in phase. The subsequent process is the same as the third embodiment.

Figure 15:
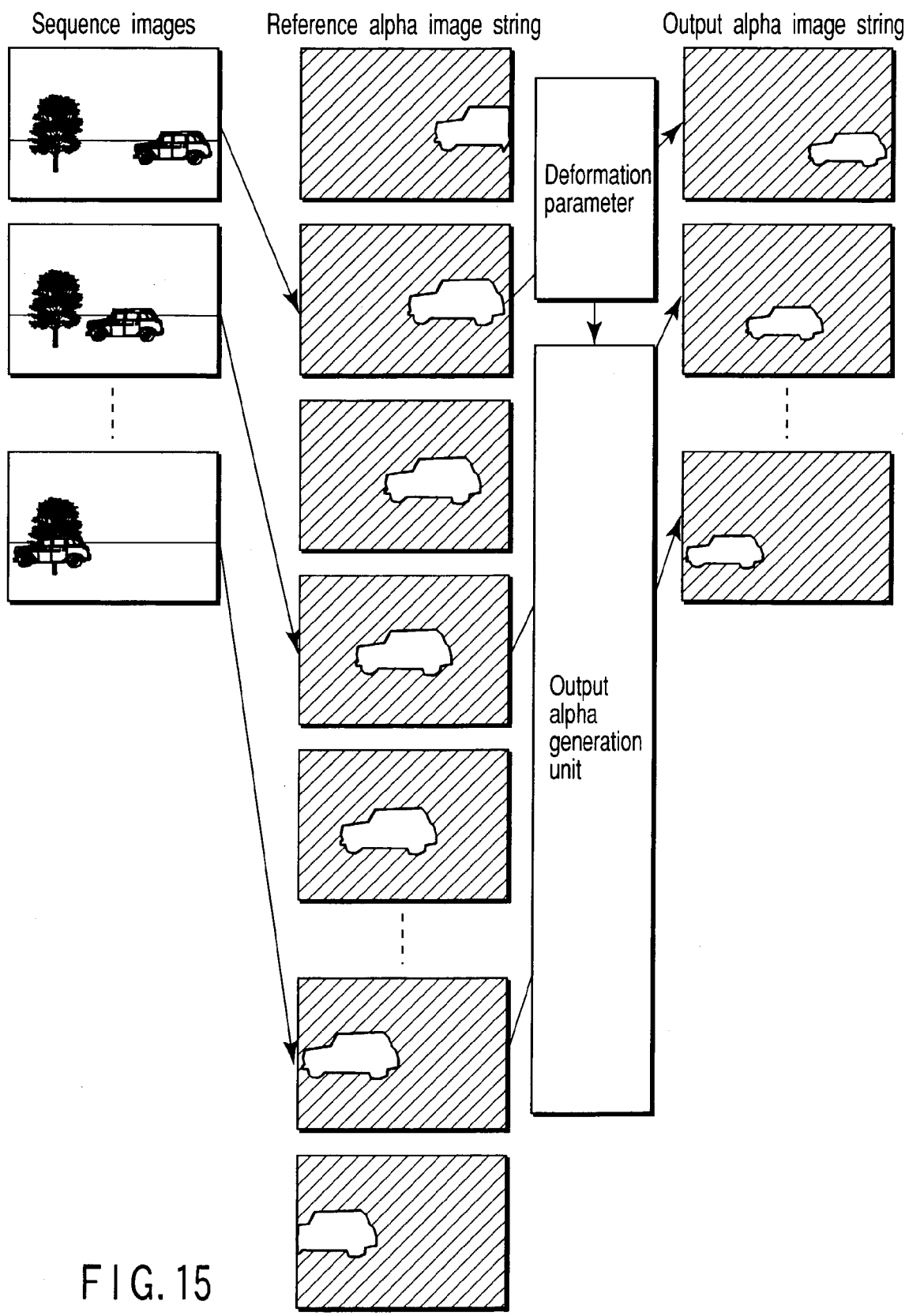
FIG. 15 is a diagram showing a processing state of a video object clipping apparatus according to the seventh embodiment.

There will now be described a method for preparing a reference alpha image string at a high frame rate and clipping a video object from a sequential image using deformation of the reference alpha image string, referring to FIG. 15.

The criteria sequential image and criteria reference alpha image that are associated as shown by the arrow (a) in FIG. 14 are input to the deformation parameter determination unit 103, to determine an output alpha image and a deformation parameter with respect to the criteria sequential image. The output alpha image generation unit 104 deforms the reference alpha images that are associated with the remaining sequential images as shown by the arrow (b) in FIG. 14 by the same deformation expressed by the deformation parameter. As a result, the output alpha images corresponding to the remaining sequential images can be generated.

The frame rate of the reference alpha image string which is prepared beforehand in the present method is not limited to an integer time that of the sequential image, but may be an arbitrary time. In addition, it is not necessary to prepare a frame rate increased at a constant rate in a time axis.

According to the above embodiment, even if the reference alpha image string has a higher frame rate in a time axis than the sequential image, it is possible to clip a desired video object from the sequential image. This enables to make the captured sequential image associate with the string of reference alpha images whose phase is near in time to the sequential image. As a result, it is possible to extract a moving object with a good precision.

(Eighth Embodiment)

According to the embodiment, a string of a plurality of reference alpha images, i.e., a reference alpha image string that is prepared beforehand has a higher frame rate in a time axis than that of the sequential image. A string of temporary reference alpha images with a plurality of phases is generated by downsampling the reference alpha image string using a plurality of temporary criteria alpha images as a criteria. A plurality of temporary output alpha image strings are generated by the temporary reference alpha image strings with the plural phases. At a high-speed and a good precision can be clipped a moving object from the sequential image by selecting one of the plurality of temporary output alpha image strings as a final output alpha image string.

Figure 16:
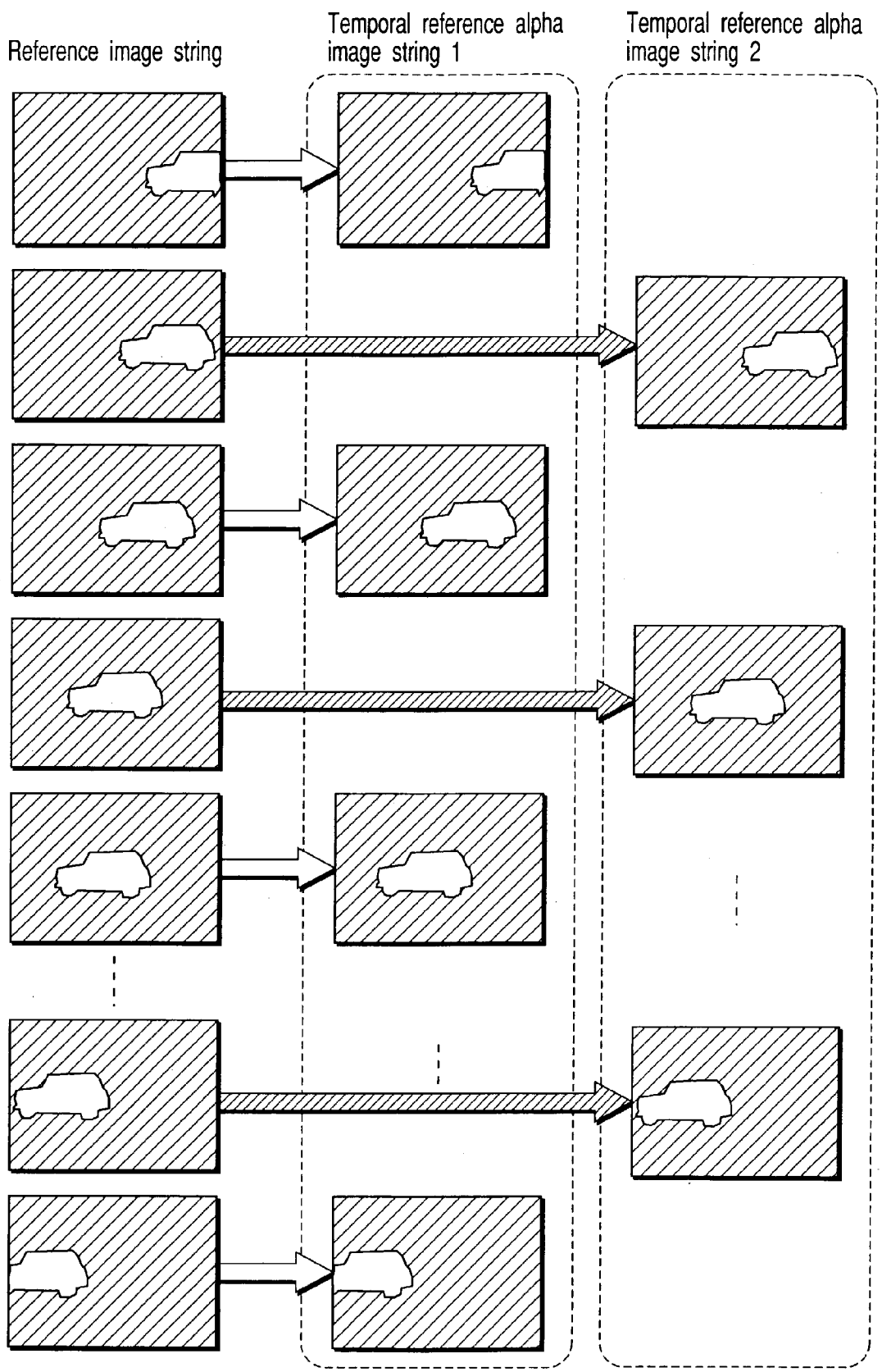
FIG. 16 is a diagram showing a status of generating a plurality of temporary reference alpha image string according to an eighth embodiment.

In FIG. 16, the reference alpha image string is prepared at a frame rate two times that of the sequential image in a time axis. Since the frame rate is two times, if the reference alpha image is selected with one frame being skipped as shown in FIG. 16, the temporary reference alpha image strings 1 and 2 which are the same in a frame rate and shifted in a phase can be generated beforehand. The temporary output alpha image strings are generated based on the temporary reference alpha image strings 1 and 2. The final output alpha image string is selected from two temporary output alpha image strings.

According to the above embodiment, even if the reference alpha image string has a higher frame rate than that of the sequential image in a time axis, it is possible to clip a desired video object from the sequential image with a higher speed and a good precision.

(Ninth Embodiment)

In the present embodiment, a plurality of reference alpha image strings are prepared for a plurality of objects individually. A plurality of deformation parameters are determined individually by deforming the criteria reference alpha images of the reference alpha image string. The criteria reference alpha images of the remaining reference alpha image strings are individually deformed by the deformation parameters, to generate a plurality of strings of output alpha images. As a result, it is possible to clip a plurality of moving objects from a video image.

Figure 17:
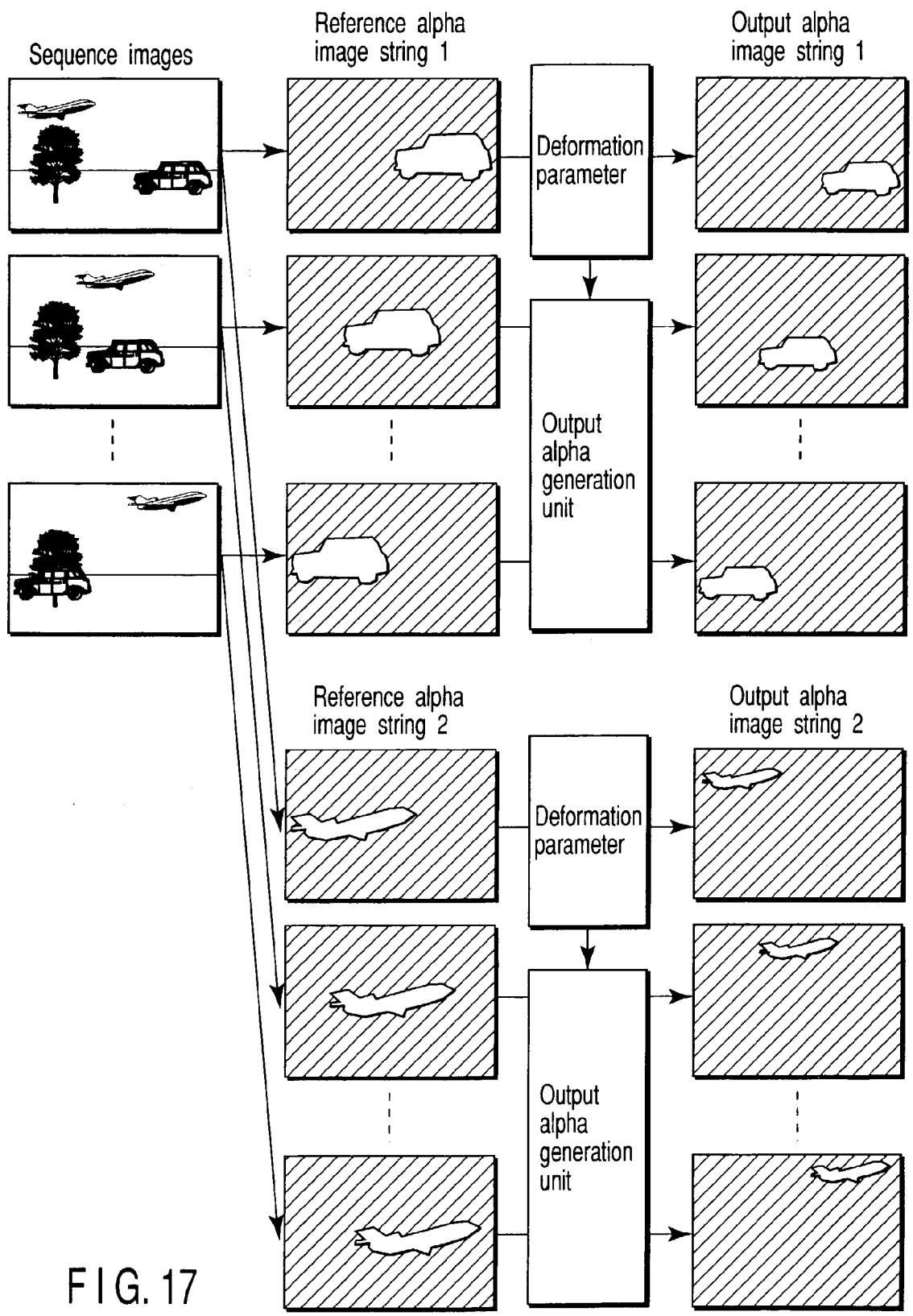
FIG. 17 is a diagram showing a status of generating a plurality of output object alpha image strings according to a ninth embodiment.

In FIG. 17, two reference alpha image strings 1 and 2 that represent two kinds of objects are prepared. In other words, a template wherein a car moves from the right to the left is prepared as the reference alpha image string 1, and a template wherein an airplane moves from the right to the left is prepared as the reference alpha image string 2. When the sequential images shown in FIG. 17 are input, respective video objects are subjected independently to the moving object clipping process which is described in the third embodiment. As a result, it is possible to generate an output alpha image string 1 and an output alpha image string 2 as shown in FIG. 17.

(Tenth Embodiment)

Figure 18:
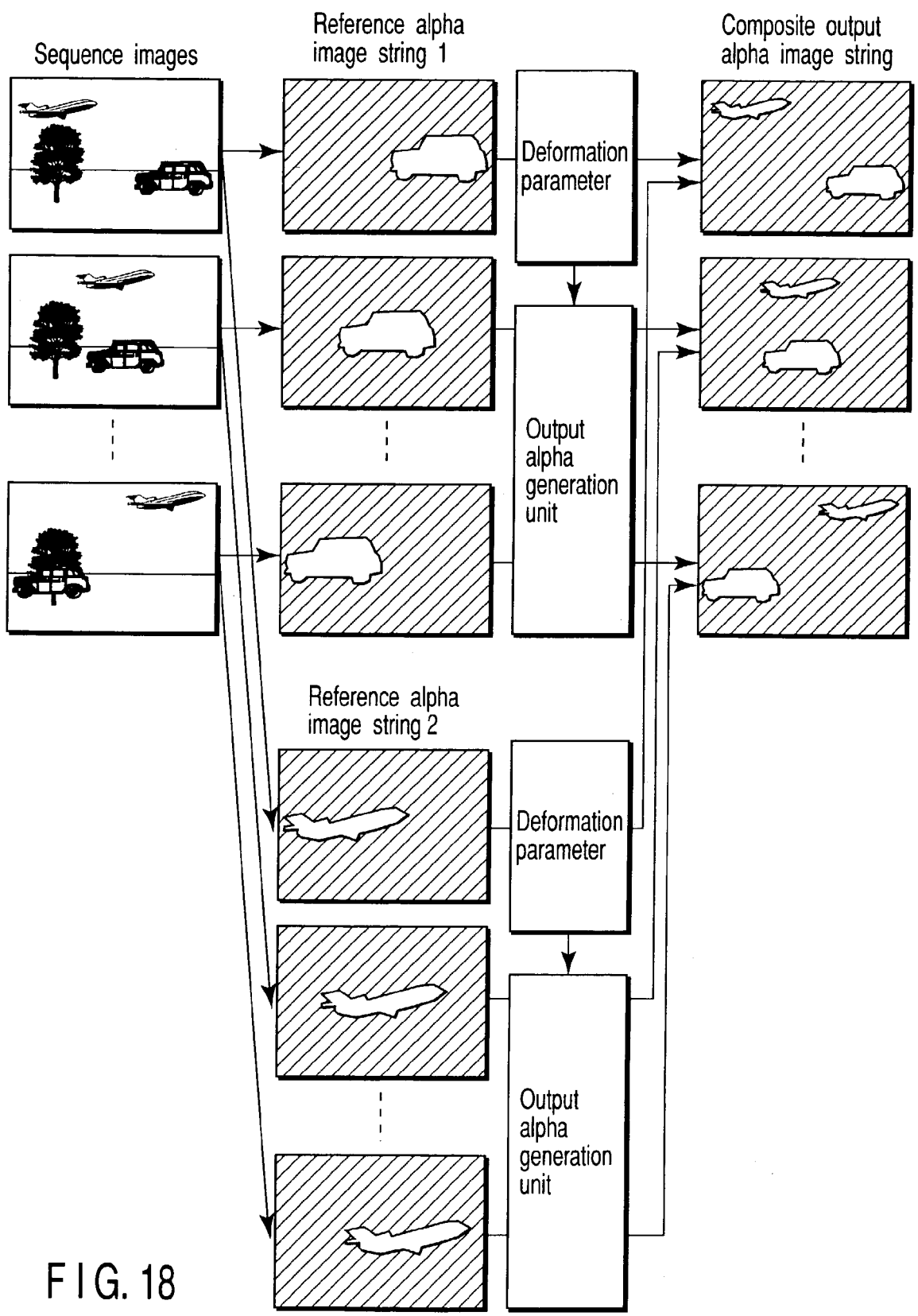
FIG. 18 is a diagram showing a status of generating an output alpha image string by the sum of a plurality of video objects in a video object clipping process according to a tenth embodiment.

According to this embodiment, the video objects of the output alpha image strings provided by the moving object clipping apparatus of the ninth embodiment are added to generate a string of composite output alpha images. In FIG. 18, the moving objects are clipped independently by the reference alpha image strings 1 and 2. Thereafter, the output alpha image strings are combined to generate the composite output alpha image string.

(Eleventh Embodiment)

This embodiment performs a postprocessing of the moving object clipping process in the first embodiment or the moving object clipping process for clipping a moving object from the sequential image in the third embodiment. In other words, the position of the contour which is a boundary between an video object and a background region in the output alpha image is corrected every frame for a plurality of output alpha images or an output alpha image string. As a result, the precision of the object clipping can be improved. The correction of the contour uses luminance information of the original image and contour information of the output alpha image. Using technique such as a literature "High accuracy detection of subject contour with the use of LIFS", Ida, Sanbonnsugi, Watanabe (Institute of Electronics, Information and Communication Engineers article magazine, D-II, Vol, J82-D-II, NO. 8, page 1282–1289, August, 1999), the position of contour can be corrected. This contour correction is shown in FIG. 19.

Figure 19:
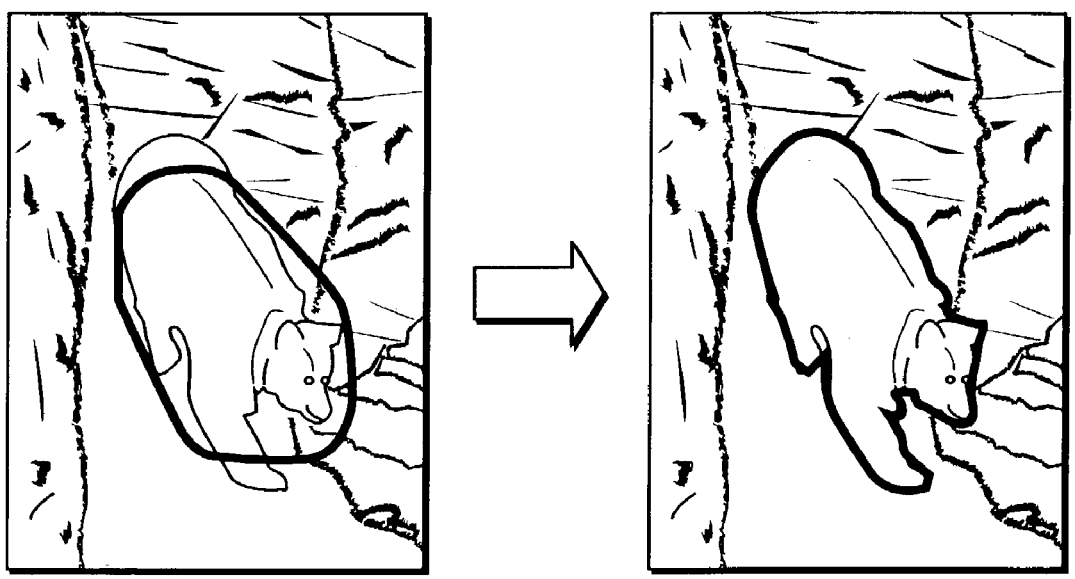
FIG. 19 is a diagram showing an image processing status obtained by a contour correcting unit in a video object clipping process according to an eleventh embodiment.
Figure 20:
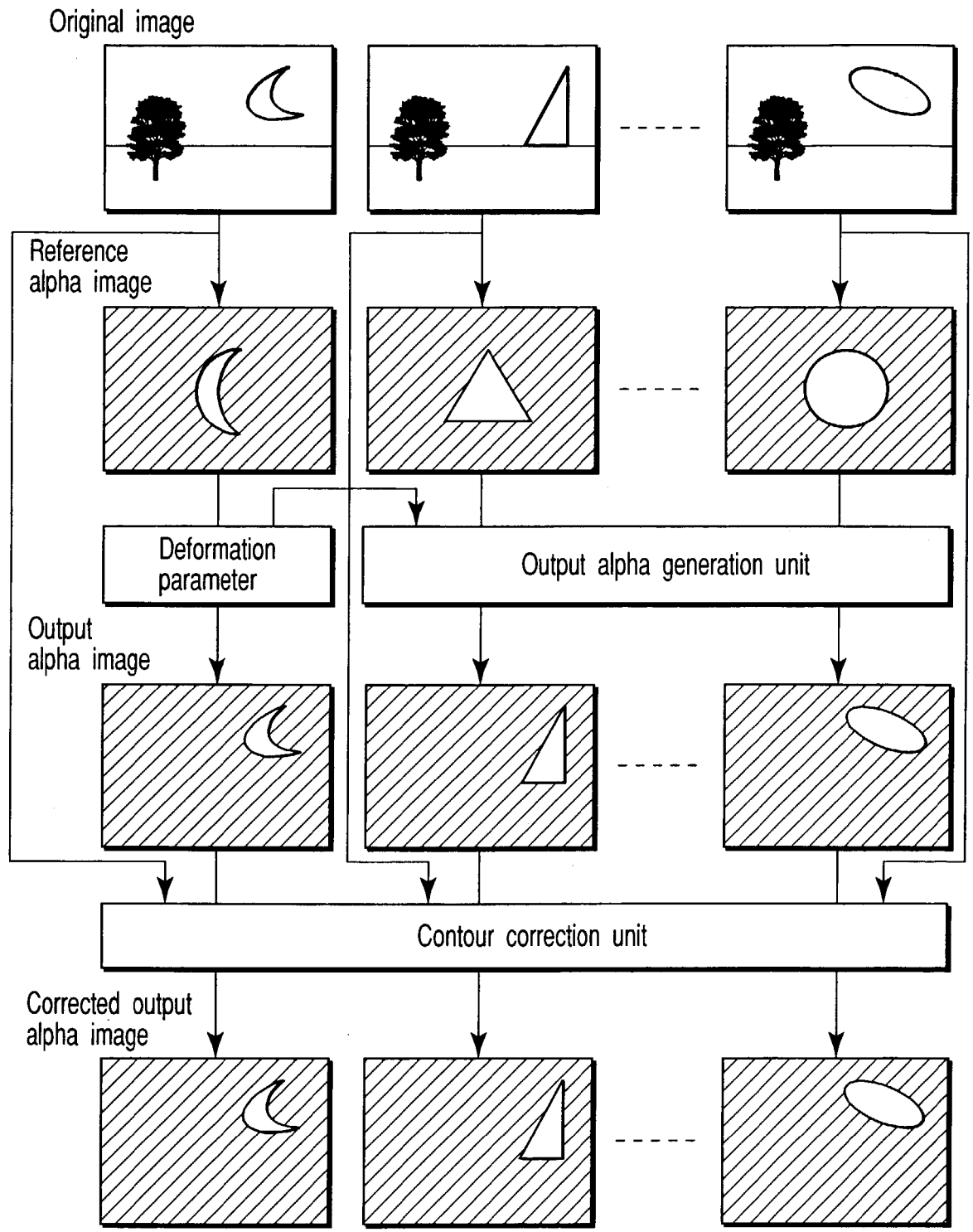
FIG. 20 is a diagram showing an image processing status of a video object clipping apparatus according to the tenth embodiment.

When a rough contour as shown in black is drew to a bear as shown in the left of FIG. 19, the contour is corrected as shown in the right of FIG. 19. As a result, the clipping precision increases. When a plurality of generated output alpha images and a plurality of original images are input to the contour correction unit as shown in FIG. 20, a plurality of corrected output alpha images can be generated. In FIG. 20, the video objects of a plurality of remaining original images are clipped using the deformation of a plurality of remaining reference alpha images according to a deformation parameter indicating a deformation of the criteria original image and criteria reference alpha image similarly to the method of the first embodiment. Each of a plurality of output alpha images is input to the contour correction unit. Also, the original images corresponding to the output alpha images are input to the contour correction unit. The video object expressed by these output alpha images is defined as a schematic contour of the object. The schematic contour is corrected by luminance information of the schematic contour and original image. This process is performed every frame and a plurality of corrected output alpha images corresponding to a plurality of original image are finally output.

By the above embodiment, the video object can be clipped at a good precision.

(Twelfth Embodiment)

GUI (Graphical User Interface) for outputting, as output alpha images, alpha images expressing the video objects of a plurality of original images is explained hereinafter.

Figure 21:
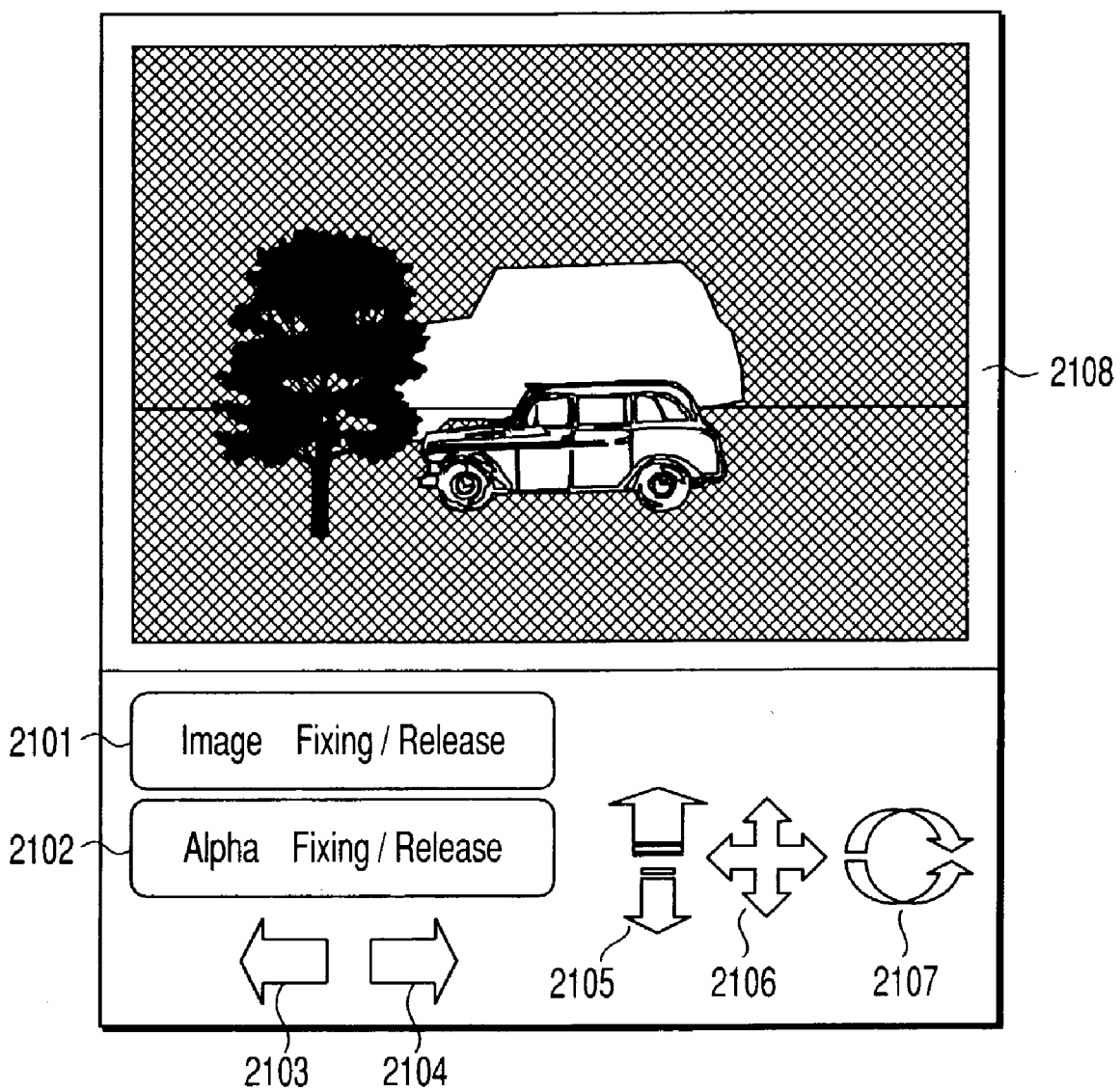
FIG. 21 is a diagram showing GUI of a video object clipping apparatus according to a twelfth embodiment.

FIG. 21 shows an example of GUI for adjusting a string of reference alpha images with respect to a time axis and a spatial axis. A button 2101 is used for determining or releasing a criteria sequential image to be fixed in a time axis to match a phase between the sequential image and the reference alpha image string as described in the fifth embodiment. A button 2102 is used for determining or releasing a criteria reference alpha image to be fixed in a time axis to match a phase between the sequential image and the reference alpha image string as described in the sixth embodiment. A user selects a suitable criteria sequential image and criteria reference alpha image using buttons 2103 and 2104. The button 2103 is used for displaying a temporary criteria reference alpha image which is not fixed or a temporary criteria sequential image with one frame changed to a past frame in time. The button 2104 is used for displaying a temporary criteria reference alpha image which is not fixed or a temporary criteria sequential image with one frame changed to a future frame in time. When the buttons 2101 and 2102 are a release mode together, the sequential image and the reference alpha image string are changed in a time axis. If the criteria sequential image and the criteria reference alpha image are associated in the time axis, the spatial positions and sizes of the criteria sequential image and criteria reference alpha image are matched by the buttons 2105, 2106 and 2107. The button 2105 performs a scaling of the reference alpha image. The button 2106 performs a parallel movement of the reference alpha image. The button 2107 is actuated for rotating the reference alpha image. The actuations of the buttons 2101 to 2107 supply control signals to the control unit 113 so that the desired processes are executed by the control unit 113.

The above-mentioned adjustment process for the time axis and spatial axis is displayed on a screen 2108 to ensure a deformation result. In the above embodiment, the original image and reference alpha image are superposed and displayed, but may be displayed on separated windows.

Figure 22:
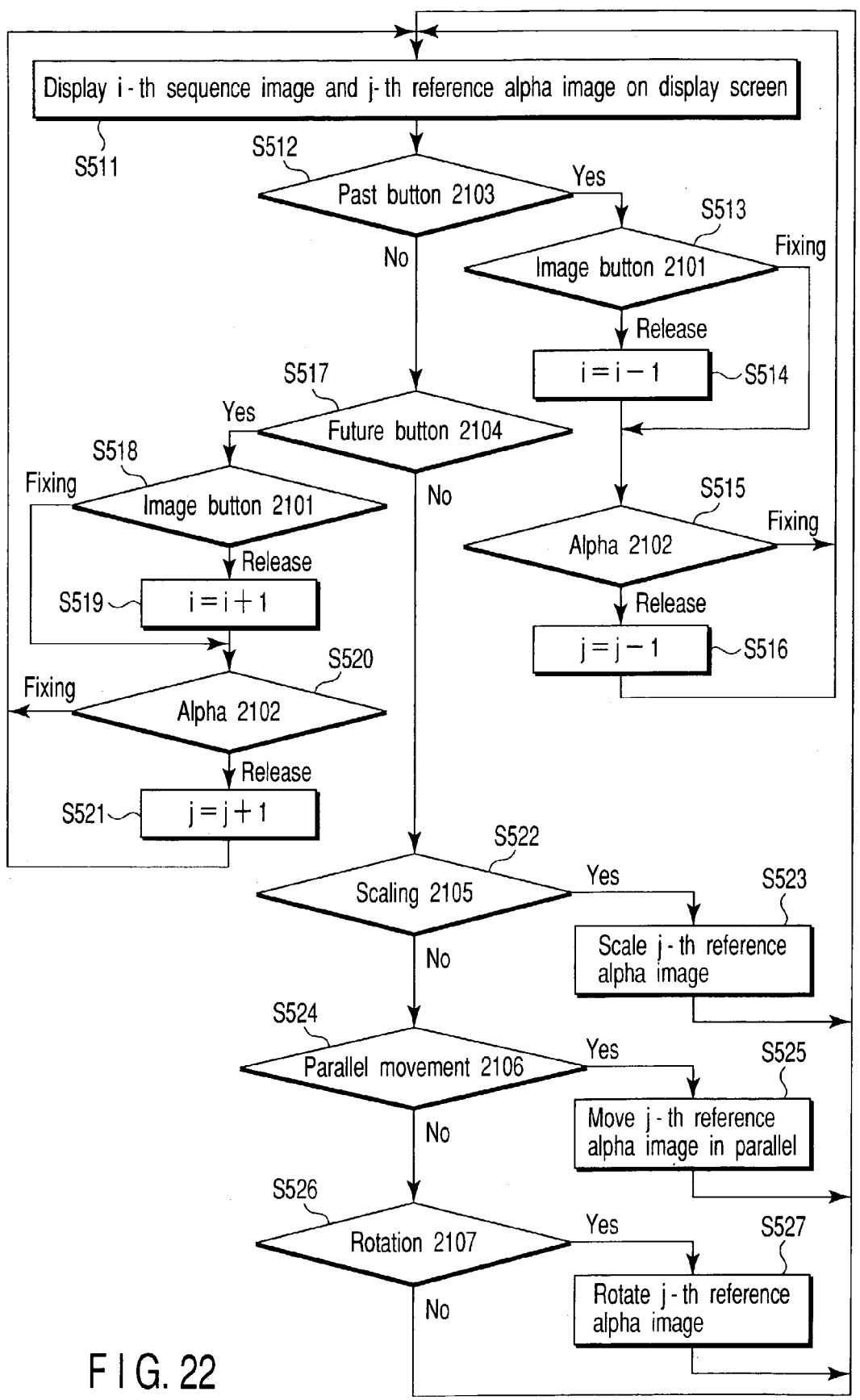
FIG. 22 is a flowchart showing a flow of GUI in a video object clipping process according to the twelfth embodiment.

The adjustment of the sequential image and the reference alpha image string with respect to the time axis and spatial axis with the use of the GUI will be described referring to FIG. 22. At first, a currently selected sequential image (i-th frame) and reference alpha image (j-th frame) are displayed on a display screen 2108 (S511).

It is determined whether the past button 2103 is set to a past frame (S512). If this determination is YES, it is determined whether the image button 2101 is a fixing mode or a release mode (S513). If the release mode is set, the frame number of the sequential image is updated to a (i−1)-th frame (S514). If the image button 2101 is set to the fixing mode, the frame number of the sequential image is fixed to the i-th frame.

It is determined whether the alpha image string button 2102 is set to the fixing mode (S515). If the button 2102 is set to the release mode, the frame number of the reference alpha image is updated to the (j−1)-th frame (S516). If the button 2102 is set to the fixing mode, the frame number of the reference alpha image is fixed to the j-th frame, and the process returns to step S511. In other words, the sequential image (i-th frame) and the reference alpha image (j-th frame) are displayed on the display screen 2108.

When the determination in step S512 is NO, whether the future button 2104 is set by a future frame (S517) is determined. When this determination is YES, it is determined whether the image button 2101 is set to the fixing mode or the release mode (S518). When the image button 2102 is set to the release mode, the frame number of the sequential image (i+1) is updated to a frame (S519). When carbon button 2101 is set to the fixing mode, the frame number of the sequential image is fixed to the i-th frame. It is determined whether the alpha button 2102 is set to the fixing mode or the release mode (S520). When the alpha button 2102 is set to the release mode (S520), the frame number of the reference alpha image is updated to (j+1)-th frame (S521). When the alpha button 2102 is set to the fixing mode, the frame number of the reference alpha image is fixes to the j-th frame. In other words, the frame numbers i and j are updated according to the status of each button, the process returns to the process to make the display screen 2108 display the sequential image (i-th frame) and the reference alpha image (j-th frame) (S511).

By the above-described flow, the phase matching between the sequential image and the reference alpha image string that is explained in the fifth to eighth embodiments can be realized. A process of adjusting the sequential image and reference alpha image string in a spatial axis will be described referring to FIG. 22.

The criteria sequential image and criteria reference alpha image that are adjusted in a time axis are displayed on the display screen 2108. Whether the scaling mode is set by the scaling button 2105 is determined (S522). When this determination is YES, a part showing a video object in the criteria reference alpha image is scaled up or scaled down (S523). When the determination of the scaling mode is NO, whether a parallel movement mode is set by a parallel movement button 2106 is determined (S524). When this determination is YES, the part showing the video object in the criteria reference alpha image is moved in parallel (S525). When the determination of the parallel movement mode is NO, whether a rotation mode is set by a rotation button 2107 is determined (S526). When this determination is YES, the part showing the video object in the criteria reference alpha image is rotated (S527). The process returns to step S511 to display the deformed criteria reference alpha image as a new criteria reference alpha image.

By the above-described flow, the spatial adjustment of the sequential image and the reference alpha image string that is explained in the first to fourth embodiments and the ninth to eleventh embodiments can be executed. As mentioned above, by using GUI, the user can generate a plurality of output alpha images from a plurality of original images.

(Thirteenth Embodiment)

Figure 23B:
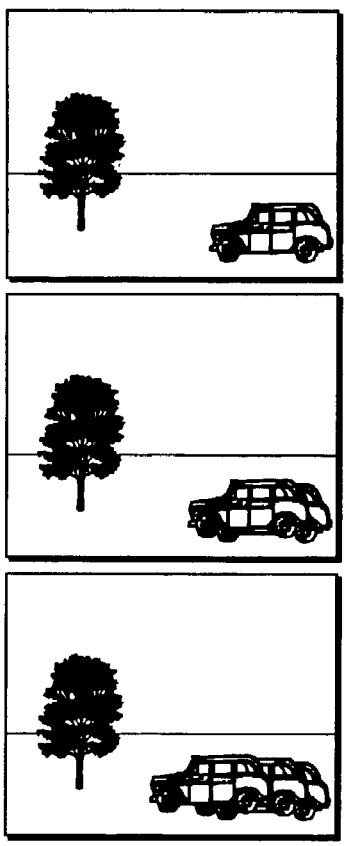
FIGS. 23A and 23B are diagrams each showing a status of a combined image obtained by a video object clipping apparatus according to a thirteenth embodiment.
Figure 23B:
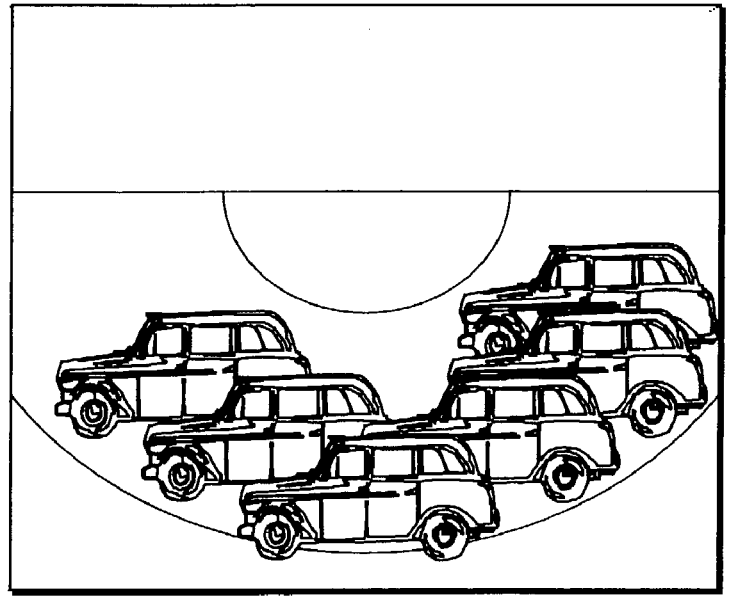
Figure 23A:
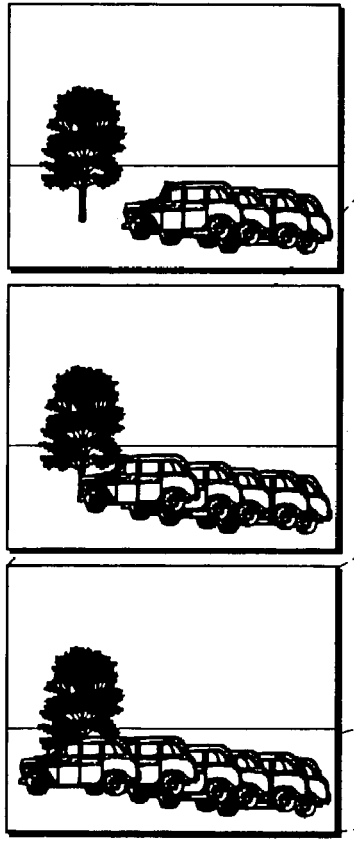
Figure 23A:
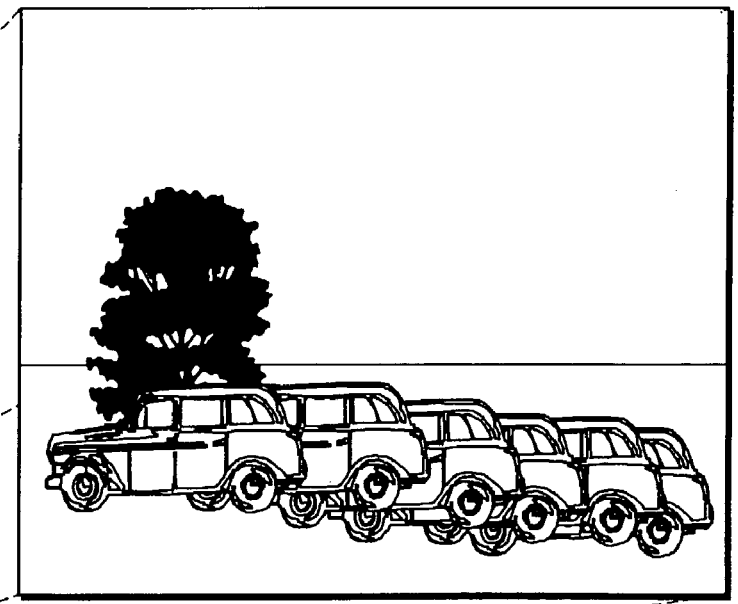
Figure 24:
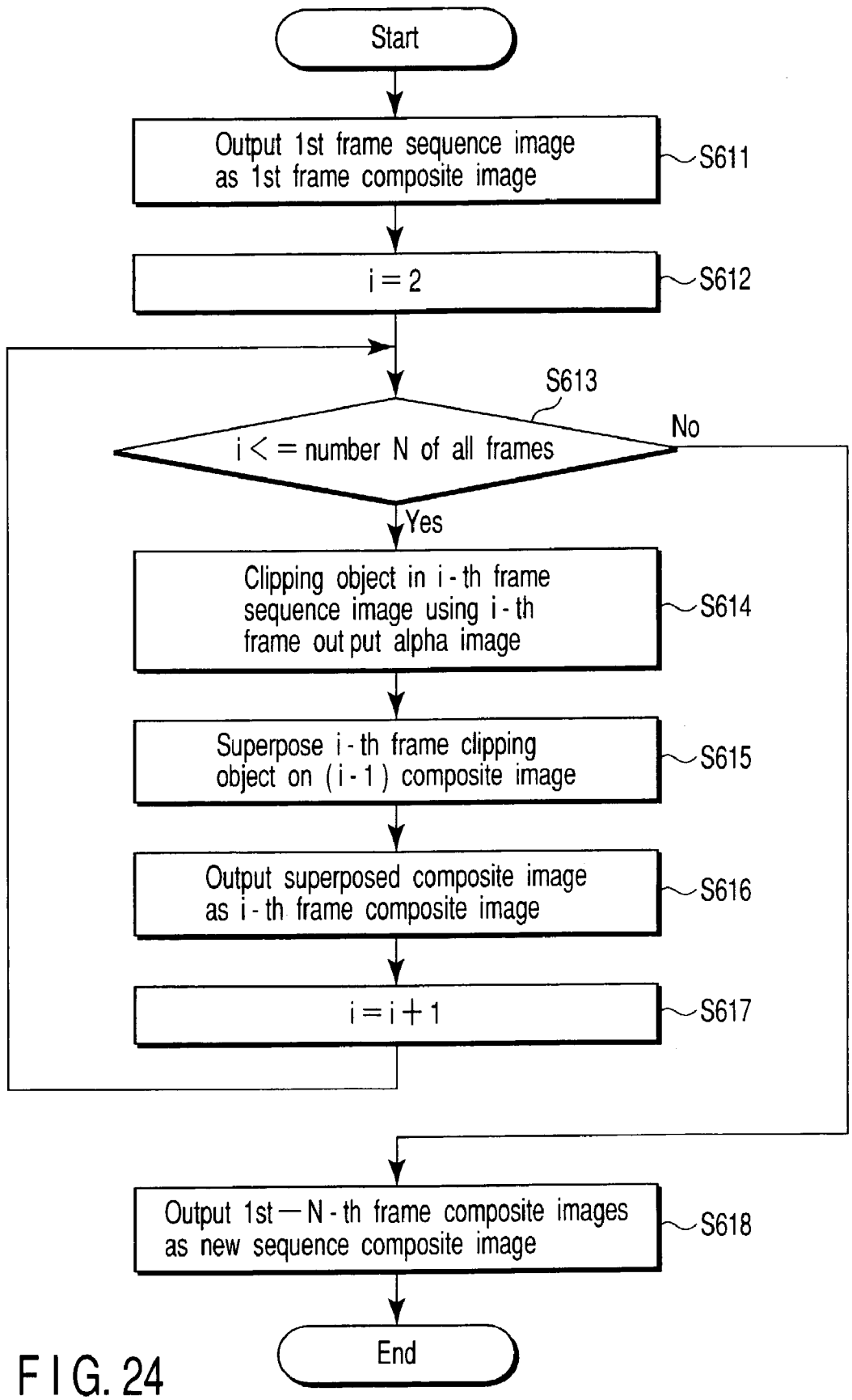
FIG. 24 is a flowchart which shows flow of GUI in an object beginning to cut process of the thirteenth embodiment.

Using a plurality of output alpha images obtained by the object clipping method explained in the first embodiment, a new imaging effect can be obtained by superposing and displaying clipped video objects. The imaging effect is shown in FIGS. 23A and 23B. FIGS. 23A and 23B show examples superposing and displaying the clipped video images of the moving cars explained in the third embodiment. The process of combining sequential images will be described referring to a flowchart of FIG. 24.

At first, a first frame sequential image is output as a first frame of composite sequential image (S611). The images from the second frame to the last N-th frame are combined. In this case, i is set to 2 (S612). It is determined that i<the number N of all frames (S613). When this determination is YES, a plurality of video objects are clipped from a plurality of output alpha images in the first embodiment (S614). A video object is clipped from the sequential image of the i-th frame using the output alpha image of the i-th frame (S615). The clipped video object of the i-th frame sequential image is superposed on the (i−1)-th frame composite image (S615). This composite image is output as the i-th frame sequence composite image (S616). Thereafter, i is updated and the process returns to step S613 (S617). The above steps are executed till N-th frame to generate a new sequence composite image. In other words, the composite image of 1st to N-th frames is output as a new sequence composite image (S618).

As thus described, in the sequential image, when the image of the first frame, the complex image of the first and second frames, the composite image of the first to third frames . . . the composite image of the first to N-th frames are displayed as new sequential images in turn, the locus of a car can be watched with movement. The locus of the car is watched as shown in FIG. 23A, and the display image can be uses as a new imaging effect.

FIG. 23A shows the locus that a car runs linearly. When the car approaches an imaging point and then goes away, depth information enables to generate a special effect image with realistic sensations as shown in FIG. 23B. In this case, if the depth information is given to the clipped video object approaching more the imaging position, the whole of the object is visible. In contrast, when the object goes away from the imaging position, large depth information is given to the cutout object. As a result, there is generated such a composite image representing a perspective configuration that other clipped video objects are superposed sequentially on the rear side of the clipped video object most closer to the imaging position as shown in FIG. 23B. The special effect image with high realistic sensations can be realized by giving the depth information to the clipped video object information according to the far and near distances of the moving object. As a modification, in step S615 shown in FIG. 24 may be provided steps of determining the far and near relation between the clipped video objects before superposing the clipped video objects and giving the depth information to the clipped video objects according to the far and near relation of the clipped video objects. The above processes can be executed by a computer program.

If such a technique is applied to sports image and so on, it can be applied to a form analysis, an effective instructor image, etc.

(Fourteenth Embodiment)

Figure 25:
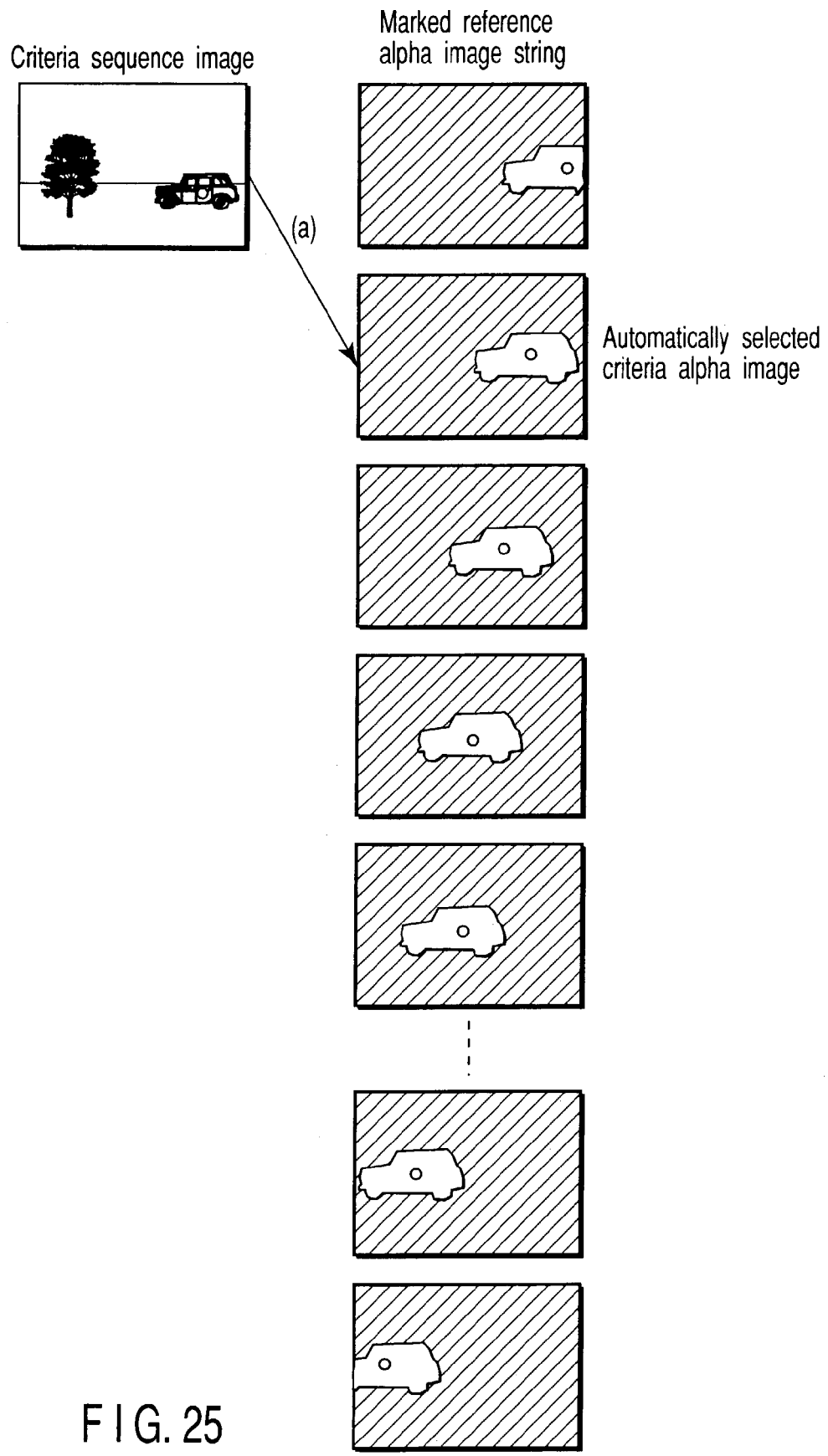
FIG. 25 is a diagram showing an image clipping process of a video object clipping apparatus according to a fourteenth embodiment.

In the present embodiment, a marking is attached to a reference alpha image string beforehand. The criteria reference alpha image and reference sequential image that are nearest in time are found by giving marking to the object of a frame in a sequential image. The phases of the found images are matched. In FIG. 25, in the reference alpha image string that a car moves from the right to the left in a screen, a marking is attached to the vicinity of the center of a car body beforehand. A reference sequential image is selected. When a criteria reference alpha image corresponding to the selected reference sequential image is to be obtained, a marking is attached to an object in the reference sequential image.

A marking ○ is attached to the vicinity of the center of the car body in the reference sequential image shown in FIG. 25. If the reference alpha image having the marking ○ in the location that is nearest to the marking ○ in the reference sequential image is searched by calculating a distance between the coordinate positions of the markings ○, the criteria reference alpha image corresponding to the reference sequential image can be determined automatically.

(Fifteenth Embodiment)

Figure 26:
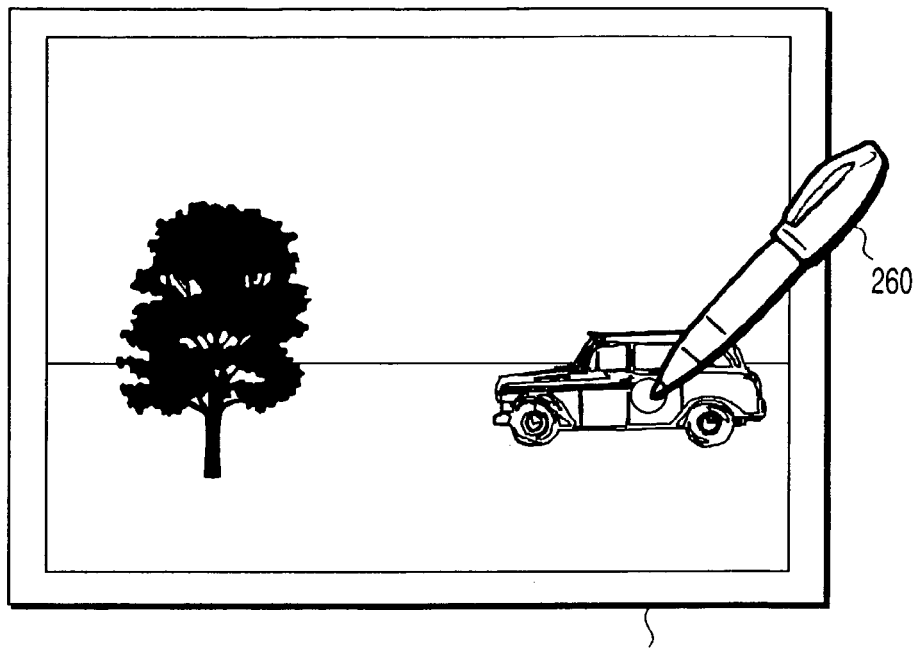
FIG. 26 is a diagram showing GUT of a video object clipping apparatus according to a fifteenth embodiment.

This embodiment is a modification of a method of matching the phase explained in the fourteenth embodiment. In this embodiments, a display screen 2601 displays a criteria sequential image selected from sequential images, and a marking unit 2602 which inputs the marking ○ to the displayed criteria sequential image to perform a phase matching. In other words, the display screen 2601 that displays the selected reference sequential image and the marking unit 2602 which inputs the mark of the displayed criteria sequential image are provided as shown in FIG. 26. The marking unit 2602 uses a pen tablet, but may use a mouse.

Figure 27:
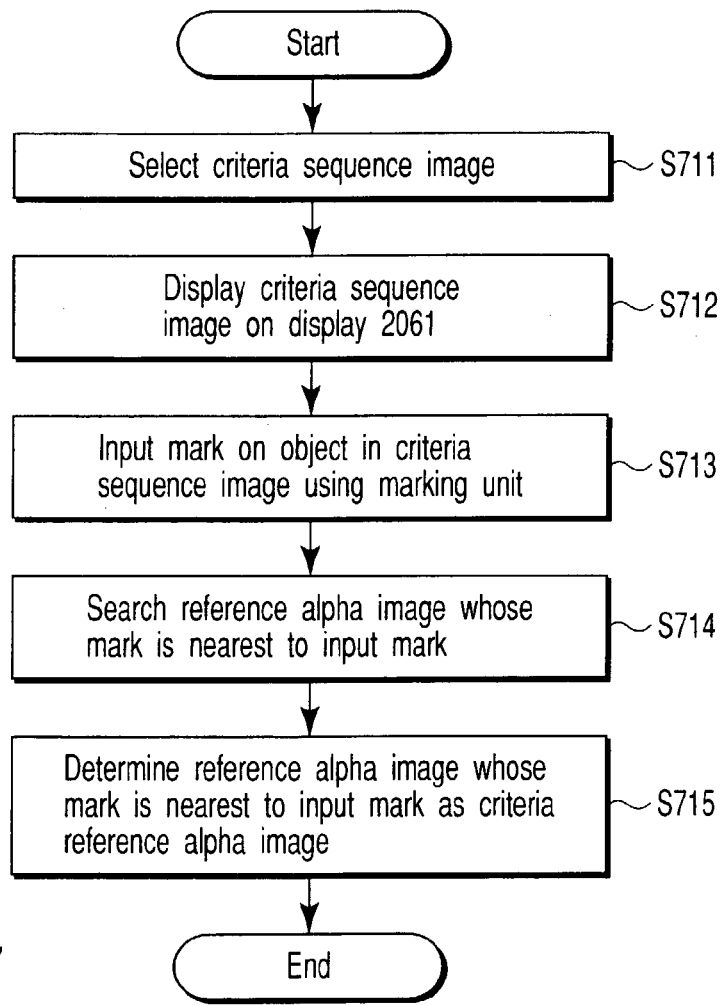
FIG. 27 is a flowchart showing a flow of GUT in the object clipping process according to the fourteenth embodiment.

The phase matching will be described using a flow chart shown in FIG. 27. At first, a reference sequential image is selected (S711) and it is displayed on the display screen 2601 (S712). A user indicates a video object in the reference sequential image using the marking unit 2602 and inputs a marking position (S713). Where of the object the user indicates is different by the position of the marking added to the reference alpha image string beforehand. The indication point is, for example, "the center of the car body" as shown in FIG. 26, or "the leftmost edge of the car body".

The reference alpha image having a marking that is nearest in position to the input marking is searched from the reference alpha image string as explained in the fourteenth embodiment (S714). The searched reference alpha image is determined as the criteria reference alpha image (S715).

As thus described, by determining the criteria reference alpha image corresponding to the reference sequential image automatically, the phase matching between the sequential image and reference alpha image sequence becomes possible. The above process is executed by the control unit 113 shown in FIG. 1 in association with the marking unit 2602.

(Sixteenth Embodiment)

The present embodiment is a modification of the moving object clipping apparatus of the third embodiment. In the present embodiments, the background image of the sequential image is saved beforehand. The position of a video object is detected by calculating a difference between the background image and the criteria sequential image. The reference alpha image nearest in time to the reference sequential image is detected based on the detected position, whereby the phase matching can be performed.

Figure 28:
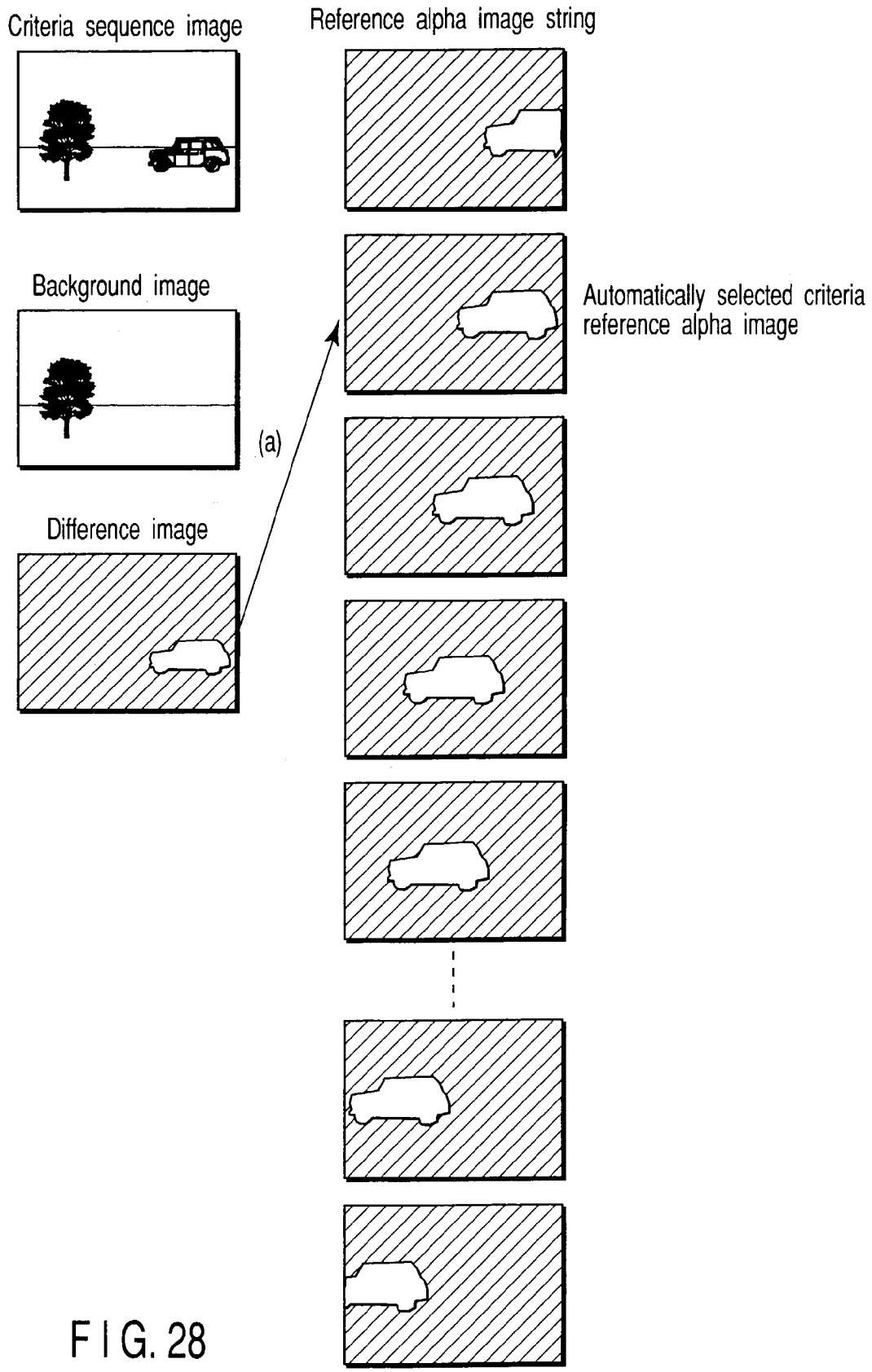
FIG. 28 is a diagram showing an image clipping process of a video object clipping apparatus according to a sixteenth embodiment.

In FIG. 28, one frame of the sequential image showing that a car moves from the right to the left in the screen is selected as the reference sequential image. The background image in which the car as the object is not imaged is prepared beforehand. The error of each pixel value of the reference sequential image and the background image is calculated as an absolute error or an average square error. By subjecting the error to a threshold process is generated a differential image shown in FIG. 28. This differential image has a pixel value "1" in an object part and a pixel value "0" in a background part, for example, and indicates the same configuration as the reference alpha image and the output alpha image which mentioned above. A criteria reference alpha image most similar to the differential image is searched from the reference alpha image string. The criteria reference alpha image can be found by searching for a reference alpha image whose video object overlaps with that of a differential image most greatly or searching for a reference alpha image whose video object has the center of gravity which is nearest to that of the video object of a differential image. In FIG. 28, the criteria reference alpha image is selected automatically as shown by (a).

According to the above embodiment, the criteria reference alpha image corresponding to the reference sequential image can be found, whereby the phases of the reference alpha image sequence and the sequential image are matched automatically.

(Seventeenth Embodiment)

The present embodiment is a modification of the moving object clipping apparatus of the third present embodiment. The moving object clipping apparatus is provided with a first differential image generation unit which generates a first differential image between a criteria sequential image of sequential images and an image of a past frame, a second differential image generation unit which generates a second differential image between the criteria reference sequential image and an image of a future frame, a detection unit which detects a position of an object by generating a logical product image obtained by logically multiplying the pixel values of the first differential image and second differential image, and a phase matching unit which matches the criteria sequential image and a reference alpha image in phase by finding the reference alpha image nearest to the criteria sequential image with respect to a time, thereby to enable a phase matching.

Figure 29:
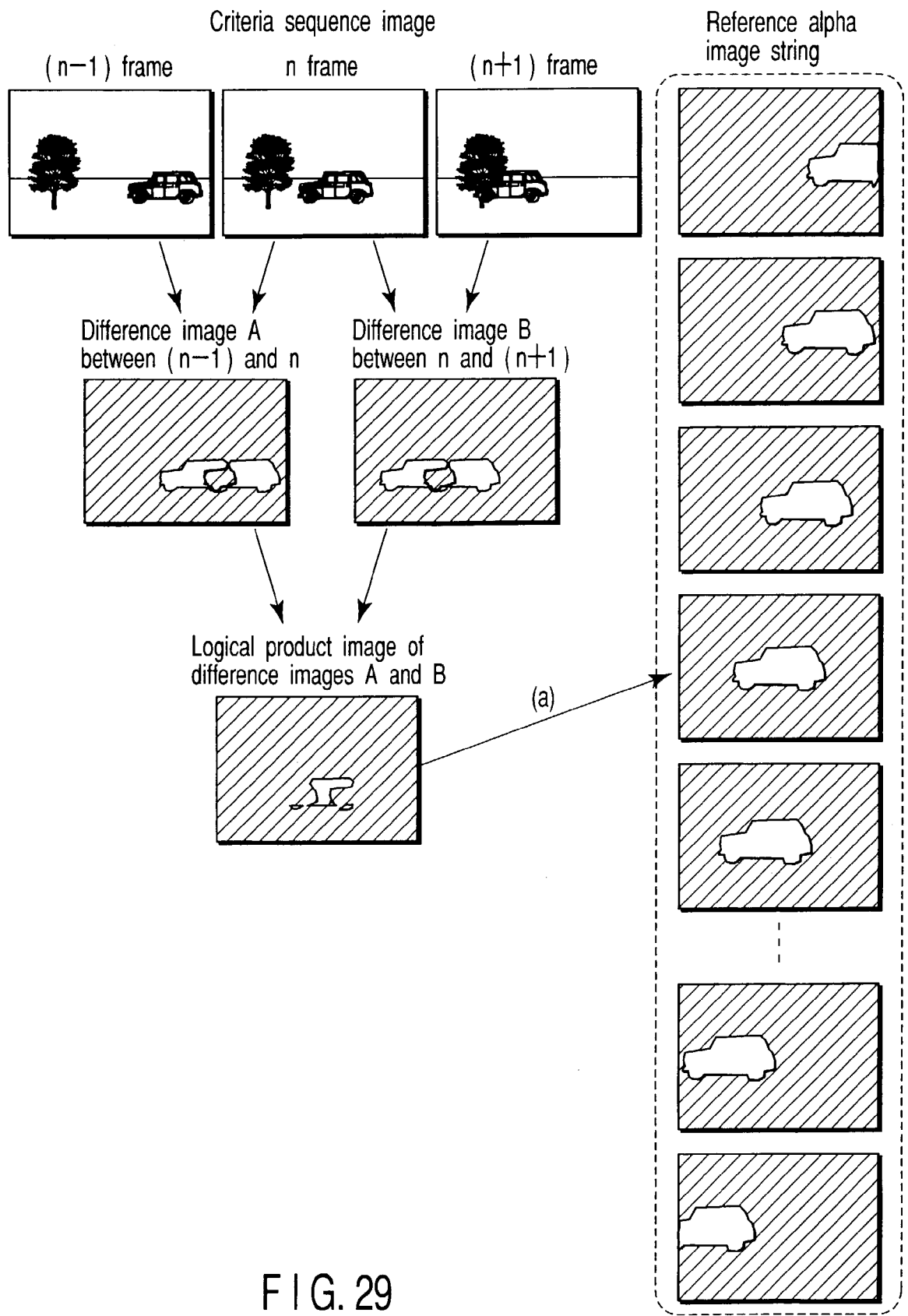
FIG. 29 is a diagram showing an image clipping process of a video object clipping apparatus according to an seventeenth embodiment.

In FIG. 29, the n-th frame of the sequential image indicating a car moving from the right to the left in a screen is selected as a reference sequential image. The error of each pixel value of the n-th frame criteria sequential image and the (n−1)-th frame sequential image are calculated as an absolute error or an average square error. By subjecting the error to a threshold process is generated a differential image shown in FIG. 28. This differential image has a pixel value "1" in an object part and a pixel value "0" in a background part, for example, and indicates the same configuration as the reference alpha image and the output alpha image which mentioned above.

The error between pixel values of the n-th frame criteria sequential image and the (n+1)-th frame sequential image is calculated, and a differential image B between the n-th frame criteria sequential image and (n+1)-th frame as shown in FIG. 29 is generated by subjecting the error to a threshold process. The pixel values of the differential image A and differential image B is subjected to a logical multiplication to generate a logical multiplication image of the differential images A and B. A part of the video object in the n-th frame reference sequential image is included in this logical multiplication image. The criteria reference alpha image most similar to this logical multiplication image is searched from the reference alpha image string. The criteria reference alpha image can be found by searching for a reference alpha image whose video object overlaps with that of a differential image most greatly or searching for a reference alpha image whose video object has the center of gravity which is nearest to that of the video object of a differential image. In FIG. 29, the criteria reference alpha image is selected automatically as shown by (a).

According to the above embodiment, the criteria reference alpha image corresponding to the reference sequential image can be found, whereby the phases of the reference alpha image sequence and the sequential image are matched automatically.

As described above, according to the video object clipping apparatus of the present invention, a plurality of alpha images are prepared as reference alpha images beforehand. A criteria reference alpha image corresponding to a reference original image is deformed to generate an output alpha image of the original image. The remaining reference alpha images are deformed according to a deformation parameter used for the above deformation to generate output alpha images of the remaining original images. As a result, alpha images expressing video objects of a plurality of original images can be easily generated. The processes according to the first to seventeenth embodiments can be executed substantially by the control unit 113.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A video object clipping method comprising:
    storing, in a storage unit, a plurality of sequential original images each including representing a substantially constant movement of a to-be-clipped object and a plurality of prepared reference alpha images representing a plurality of sequential reference images representing a substantially constant movement of a reference object;

determining a criteria original image and a criteria reference alpha image from the original images and the reference alpha images;

determining a deformation parameter by deforming the criteria reference alpha image to correspond to the criteria original image; and deforming remaining ones of the reference alpha images according to the determined deformation parameter to generate output alpha images corresponding to the original images, wherein determining the deformation parameter includes determining the deformation parameter based on matching of the criteria original image with the criteria reference alpha image, wherein the method further includes, generating a string of the reference alpha images at a frame rate in a time axis, determining a set of the criteria original image and the criteria reference alpha image, performing a phase matching by equalizing a frame rate between a string of the sequential original images and the string of the reference alphas images, the frame rate being equalized by downsampling the string of the reference alpha images using the determined criteria alpha image, and generating the output alpha images using the string of reference alpha images having the same frame rate as that of the string of the sequential original images.

2. A video object clipping method comprising:

storing, in a storage unit, a plurality of sequential original images each including representing a substantially constant movement of a to-be-clipped object and a plurality of prepared reference alpha images representing a plurality of sequential reference images representing a substantially constant movement of a reference object;

determining a criteria original image and a criteria reference alpha image from the original images and the reference alpha images;

determining a deformation parameter by deforming the criteria reference alpha image to correspond to the criteria original image; and deforming remaining ones of the reference alpha images according to the determined deformation parameter to generate output alpha images corresponding to the original images, wherein determining the deformation parameter includes determining the deformation parameter based on matching of the criteria original image with the criteria reference alpha image, wherein the string of the reference alpha images has a higher frame rate than the string of the sequential original images, and wherein the method further includes, generating a plurality of temporary reference alpha image strings with a plurality of phases by downsampling the string of the reference alpha images using a plurality of temporary criteria alpha images, generating a plurality of temporary output alpha image strings based on the temporary reference alpha image strings, and selecting one of the temporary output alpha images as a final output alpha image string.

3. A video object clipping method comprising:

storing, in a storage unit, a plurality of sequential original images each including representing a substantially constant movement of a to-be-clipped object and a plurality of prepared reference alpha images representing a plurality of sequential reference images representing a substantially constant movement of a reference object;

determining a criteria original image and a criteria reference alpha image from the original images and the reference alpha images;

determining a deformation parameter by deforming the criteria reference alpha image to correspond to the criteria original image; and deforming remaining ones of the reference alpha images according to the determined deformation parameter to generate output alpha images corresponding to the original images, wherein determining the deformation parameter includes determining the deformation parameter based on matching of the criteria original image with the criteria reference alpha image, wherein the method further includes, attaching a first marking to each of the reference alpha images, attaching a second marking to the original object of the criteria original image, and performing a phase matching by finding the criteria reference alpha image and the criteria original image which are nearest in time to each other referring to the first marking and the second marking.

4. A video object clipping method comprising:

storing, in a storage unit, a plurality of sequential original images each including representing a substantially constant movement of a to-be-clipped object and a plurality of prepared reference alpha images representing a plurality of sequential reference images representing a substantially constant movement of a reference object;

determining a criteria original image and a criteria reference alpha image from the original images and the reference alpha images;

determining a deformation parameter by deforming the criteria reference alpha image to correspond to the criteria original image; and deforming remaining ones of the reference alpha images according to the determined deformation parameter to generate output alpha images corresponding to the original images, wherein determining the deformation parameter includes determining the deformation parameter based on matching of the criteria original image with the criteria reference alpha image, wherein the method further includes, storing a background image of the criteria original mage in the storage unit, detecting a position of the original object by obtaining a difference between the background image and the criteria original image, and performing a phase matching by finding one of the criteria reference alpha images which is nearest in time to the criteria original image based on a detection result.

5. A video object clipping method comprising:

storing, in a storage unit, a plurality of sequential original images each including representing a substantially constant movement of a to-be-clipped object and a plurality of prepared reference alpha images representing a plurality of sequential reference images representing a substantially constant movement of a reference object;

determining a criteria original image and a criteria reference alpha image from the original images and the reference alpha images;

determining a deformation parameter by deforming the criteria reference alpha image to correspond to the criteria original image; and deforming remaining ones of the reference alpha images according to the determined deformation parameter to generate output alpha images corresponding to the original images, wherein determining the deformation parameter includes determining the deformation parameter based on matching of the criteria original image with the criteria reference alpha image, wherein the method further includes, generating a first differential image between the criteria original image and a past image of the sequential original images, generating a second differential image between the criteria original image and a future image of the sequential original images, detecting a position of the object based on a logical multiplication image obtained by subjecting pixel values of the first differential image and the second differential image to a logical multiplication, and performing a phase matching by finding one of the reference alpha images which is nearest in time to the criteria sequential image based on a detection result.

6. A video object clipping apparatus comprising:

a storage unit configured to store a plurality of sequential original images representing a substantially constant movement of a to-be-clipped object and a plurality of prepared reference alpha images representing a plurality of sequential reference images representing a substantially constant movement of a reference object;

a critical image determination unit configured to determine a criteria original image and a criteria reference alpha image from the original images and the reference alpha images;

a deformation parameter determination unit configured to determine a deformation parameter by deforming the criteria reference alpha image to correspond to the criteria original image; and a deform unit configured to deform remaining ones of the reference alpha images according to the determined deformation parameter to generate output alpha images corresponding to the original images, wherein the deformation parameter determination unit comprises a determination unit configured to determine the deformation parameter based on matching of the criteria original image and the criteria reference alpha image, wherein the apparatus further includes, means for generating a string of the reference alpha images at a frame rate in a time axis, means for determining a set of the criteria original image and the criteria reference alpha image, means for performing a phase matching by equalizing a frame rate between a string of the sequential original images and the string of the reference alphas images, the frame rate being equalized by downsampling the string of the reference alpha images using the determined criteria alpha image, and means for generating the output alpha images using the string of the reference alpha images having the same frame rate as that of the string of the sequential original images.

7. A video object clipping apparatus comprising:

a storage unit configured to store a plurality of sequential original images representing a substantially constant movement of a to-be-clipped object and a plurality of prepared reference alpha images representing a plurality of sequential reference images representing a substantially constant movement of a reference object;

a critical image determination unit configured to determine a criteria original image and a criteria reference alpha image from the original images and the reference alpha images;

a deformation parameter determination unit configured to determine a deformation parameter by deforming the criteria reference alpha image to correspond to the criteria original image; and a deform unit configured to deform remaining ones of the reference alpha images according to the determined deformation parameter to generate output alpha images corresponding to the original images, wherein the deformation parameter determination unit comprises a determination unit configured to determine the deformation parameter based on matching of the criteria original image and the criteria reference alpha image, wherein the string of the reference alpha images has a higher frame rate than the string of the sequential original images, and wherein the apparatus further includes, means for generating a plurality of temporary reference alpha image strings with a plurality of phases by downsampling the string of the reference alpha images using a plurality of temporary criteria alpha images as a criteria, means for generating a plurality of temporary output alpha image strings based on the string of the temporary reference alpha images with plural phases, and means for selecting one of the temporary output alpha images as a final output alpha image string.

8. A video object clipping apparatus comprising:

a storage unit configured to store a plurality of sequential original images representing a substantially constant movement of a to-be-clipped object and a plurality of prepared reference alpha images representing a plurality of sequential reference images representing a substantially constant movement of a reference object;

a critical image determination unit configured to determine a criteria original image and a criteria reference alpha image from the original images and the reference alpha images;

a deformation parameter determination unit configured to determine a deformation parameter by deforming the criteria reference alpha image to correspond to the criteria original image; and a deform unit configured to deform remaining ones of the reference alpha images according to the determined deformation parameter to generate output alpha images corresponding to the original images, wherein the deformation parameter determination unit comprises a determination unit configured to determine the deformation parameter based on matching of the criteria original image and the criteria reference alpha image, wherein the apparatus further includes:

means for attaching a first marking to each of the reference alpha images, means for attaching a second marking to the original object of the criteria original image, and means for performing a phase matching by finding the criteria reference alpha image and the criteria original image which are nearest in time to each other referring to the first marking and the second marking.

9. A video object clipping apparatus comprising:

a storage unit configured to store a plurality of sequential original images representing a substantially constant movement of a to-be-clipped object and a plurality of prepared reference alpha images representing a plurality of sequential reference images representing a substantially constant movement of a reference object;

a critical image determination unit configured to determine a criteria original image and a criteria reference alpha image from the original images and the reference alpha images;

a deformation parameter determination unit configured to determine a deformation parameter by deforming the criteria reference alpha image to correspond to the criteria original image; and a deform unit configured to deform remaining ones of the reference alpha images according to the determined deformation parameter to generate output alpha images corresponding to the original images, wherein the deformation parameter determination unit comprises a determination unit configured to determine the deformation parameter based on matching of the criteria original image and the criteria reference alpha image, wherein the storage unit stores a background image of the criteria original image, and wherein the apparatus further includes, means for detecting a position of the original object by obtaining a difference between the background image and the criteria original image, and means for performing a phase matching by finding one of the criteria reference alpha images which is nearest in time to the criteria original image based on a detection result.

10. A video object clipping apparatus comprising:

a storage unit configured to store a plurality of sequential original images representing a substantially constant movement of a to-be-clipped object and a plurality of prepared reference alpha images representing a plurality of sequential reference images representing a substantially constant movement of a reference object;

a critical image determination unit configured to determine a criteria original image and a criteria reference alpha image from the original images and the reference alpha images;

a deformation parameter determination unit configured to determine a deformation parameter by deforming the criteria reference alpha image to correspond to the criteria original image; and a deform unit configured to deform remaining ones of the reference alpha images according to the determined deformation parameter to generate output alpha images corresponding to the original images, wherein the deformation parameter determination unit comprises a determination unit configured to determine the deformation parameter based on matching of the criteria original image and the criteria reference alpha image, wherein the apparatus further includes, means for generating a first differential image between the criteria original mage and a past image of the sequential original images, means for generating a second differential image between the criteria original image and a future image of the sequential original images, means for detecting a position of the object based on a logical multiplication image obtained by subjecting pixel values of the first differential image and the second differential image to a logical multiplication, and means for performing a phase matching by finding one of the reference alpha images which is nearest in time to the criteria sequential image based on a detection result.

* * * * *